(12) United States Patent
Cloud

(10) Patent No.: US 12,236,459 B2
(45) Date of Patent: Feb. 25, 2025

(54) INFORMATION-MARKET SYSTEM

(71) Applicant: Douglas R. Cloud, Tacoma, WA (US)

(72) Inventor: Douglas R. Cloud, Tacoma, WA (US)

( * ) Notice: Subject to any disclaimer, the term of this patent is extended or adjusted under 35 U.S.C. 154(b) by 0 days.

(21) Appl. No.: 18/594,593

(22) Filed: Mar. 4, 2024

(65) Prior Publication Data
US 2024/0212002 A1 Jun. 27, 2024

Related U.S. Application Data

(63) Continuation of application No. 17/737,604, filed on May 5, 2022, now Pat. No. 11,941,670, which is a continuation of application No. 16/418,665, filed on May 21, 2019, now abandoned, which is a continuation of application No. 13/710,105, filed on Dec. 10, 2012, now Pat. No. 10,296,947, which is a continuation-in-part of application No. 12/001,052, filed on Nov. 28, 2007, now abandoned.

(51) Int. Cl.
| | |
|---|---|
| G06Q 30/02 | (2023.01) |
| G06Q 30/0241 | (2023.01) |
| G06Q 30/0273 | (2023.01) |
| G06Q 30/0283 | (2023.01) |

(52) U.S. Cl.
CPC ......... *G06Q 30/0277* (2013.01); *G06Q 30/02* (2013.01); *G06Q 30/0273* (2013.01); *G06Q 30/0275* (2013.01); *G06Q 30/0283* (2013.01)

(58) Field of Classification Search
CPC ........... G06Q 30/0277; G06Q 30/0275; G06Q 30/0283; G06Q 30/0273; G06Q 30/02
See application file for complete search history.

(56) References Cited

U.S. PATENT DOCUMENTS

| | | |
|---|---|---|
| 6,195,646 B1 | 2/2001 | Grosh et al. |
| 7,095,854 B1 | 8/2006 | Ginter |
| 7,587,368 B2 | 9/2009 | Feischer |
| 2002/0010684 A1 | 1/2002 | Moskowitz |
| 2002/0048369 A1 | 4/2002 | Ginter et al. |

(Continued)

OTHER PUBLICATIONS

"Value-added ERP information into information goods: an economic analysis" Ming-Hui Huang: Jyun-Cheng Wang: Shihti Yu; Chui-Chen Chiu Industrial Management + Data Systems: 2004; 104, 8/9; ABI/Inform Global p. 689-697.

(Continued)

*Primary Examiner* — Scott S Trotter
(74) *Attorney, Agent, or Firm* — Jon E. Gordon; Haug Partners LLP

(57) ABSTRACT

The current application is directed to methods and systems that provide an information market in which information producers sell information, advertisers purchase consumption of advertisements, and information consumers purchase information from information producers and receive compensation from advertisers through automated and semi-automated information-market transactions. The information market provides a transaction-based marketplace for the provision and consumption of information in much the same way as various types of financial markets provide a marketplace for cost-effective exchange of goods and services. The transaction-based information market provides flexibility and control to both information providers and information consumers as well as the cost efficiency of a transaction-based information marketplace.

16 Claims, 22 Drawing Sheets

(56) References Cited

U.S. PATENT DOCUMENTS

| | | |
|---|---|---|
| 2002/0133438 A1 | 9/2002 | Tarr |
| 2003/0149642 A1 | 8/2003 | Perkowski |
| 2004/0153378 A1 | 8/2004 | Perkowski |
| 2006/0293995 A1 | 12/2006 | Borgs et al. |
| 2007/0079326 A1 | 4/2007 | Datta et al. |
| 2007/0088609 A1 | 4/2007 | Reller et al. |
| 2007/0140451 A1 | 6/2007 | Atberg et al. |
| 2007/0156838 A1 | 7/2007 | Kocho et al. |
| 2007/0239560 A1 | 10/2007 | McGuire et al. |
| 2007/0266399 A1 | 11/2007 | Sidi |
| 2007/0271136 A1 | 11/2007 | Strauss et al. |
| 2008/0065481 A1 | 3/2008 | Immorlica |
| 2008/0097843 A1 | 4/2008 | Menon et al. |
| 2008/0275777 A1 | 11/2008 | Protheroe |
| 2008/0306815 A1 | 12/2008 | Dykes |
| 2009/0144108 A1 | 6/2009 | Cloud |
| 2009/0265243 A1 | 10/2009 | Karassner |

OTHER PUBLICATIONS

"An overview of information ethics issues in a world-wide context" Elizabeth A. Buchanan Ethics and Information Technology 1: 193-201, 1999.

INFORMATION-MARKET SYSTEM

CROSS-REFERENCE TO RELATED APPLICATIONS

This application is a continuation of application Ser. No. 17/737,604, filed May 5, 2022, which is a continuation of application Ser. No. 16/418,665, filed May 21, 2019, and now abandoned, which is a continuation of application Ser. No. 13/710,105, filed Dec. 10, 2012, and issued May 21, 2019, as U.S. Pat. No. 10,296,947, which is a continuation-in-part of application Ser. No. 12/001,052, filed Nov. 28, 2007, and now abandoned.

TECHNICAL FIELD

The current application is directed to distribution of information through electronic communications, including the Internet and, in particular, methods and systems that implement an information market that provides for automated exchange of information and value within the information market.

BACKGROUND

The distribution of information has been a fundamental activity in human societies for many thousands of years. Up until the 1400s, information distribution was primarily carried out orally and through hand-written documents and texts. The invention of the printing press greatly accelerated information distribution and information exchange. In the 1800s and 1900s, development of electronic communications, including the telegraph, telephone, and broadcast technologies, including radio and television, vastly increased the capacity for information exchange and vastly decreased the cost of distributing information. Beginning in the 1950s, the development of electronic computers and computer-driven electronic communications, including various types of high-bandwidth electronic and optical communications media represented another leap in the speed, capacity, and cost-effectiveness of information distribution, ultimately spawning the Internet and Internet-associated methods and systems for distribution of a variety of different types of information, from text and graphics to streaming video, to a wide variety of different types of processor-controlled devices, including electronic laptops, notebooks, tablets and pads, personal computers, mobile phones, and a host of other electronic devices. A modern grade school student, as one example, can currently access, through using an inexpensive personal computer, far more information and a greater diversity of information than was available, at any price, to anyone in the 1960s and 1970s.

While the sheer volume of accessible information and the speed and cost-effectiveness by which information can be accessed have increased with the development of the Internet and Internet-associated methods for information distribution and exchange, many of the current models for information distribution are based on decades-old broadcast-media techniques and paradigms, with limited cost efficiencies. Information providers and information consumers, as well as those who design, develop, manufacture, and sell communications systems and computers, continue to seek new methods and systems for cost-effective information distribution and information exchange.

SUMMARY

The current application is directed to methods and systems that provide an information market in which information producers sell information, advertisers purchase consumption of advertisements, and information consumers purchase information from information producers and receive compensation from advertisers through automated and semi-automated information-market transactions. The information market provides a transaction-based marketplace for the provision and consumption of information in much the same way as various types of financial markets provide a marketplace for cost-effective exchange of goods and services. The transaction-based information market provides flexibility and control to both information providers and information consumers as well as the cost efficiency of a transaction-based information marketplace. In additional implementations, individual pricing for goods and services may be provided to consumers in additional types of markets, including traditional retail markets.

DETAILED DESCRIPTION

The current application is directed to methods and systems that implement an information market in which information providers and information consumers conduct information-provision and information-consumption transactions. The information market provides similar efficiencies in information exchange that are provided by traditional financial markets for the exchange of goods and services. The information market to which the current application is directed is generally implemented within a large variety of different types of processor-controlled information-processing and communications methods and systems, including personal computers, mobile phones, server computers, and many other types of devices and systems.

Figure 1:
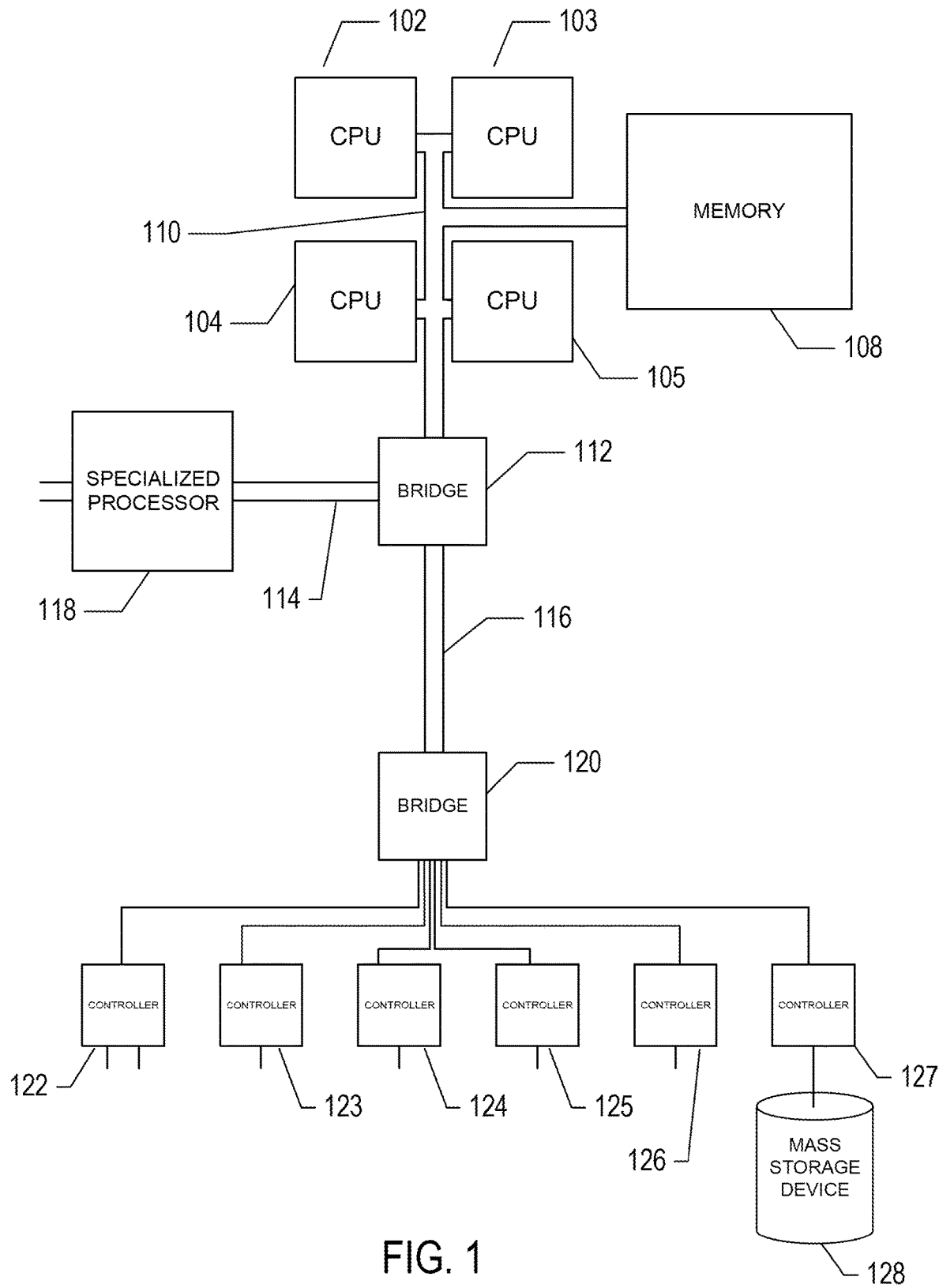
FIG. 1 provides a high-level architectural overview of personal computers, servers, and other such processor-controlled information-processing and communications devices and systems.

FIG. 1 provides a high-level architectural overview of personal computers, servers, and other such processor-controlled information-processing and communications devices and systems. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
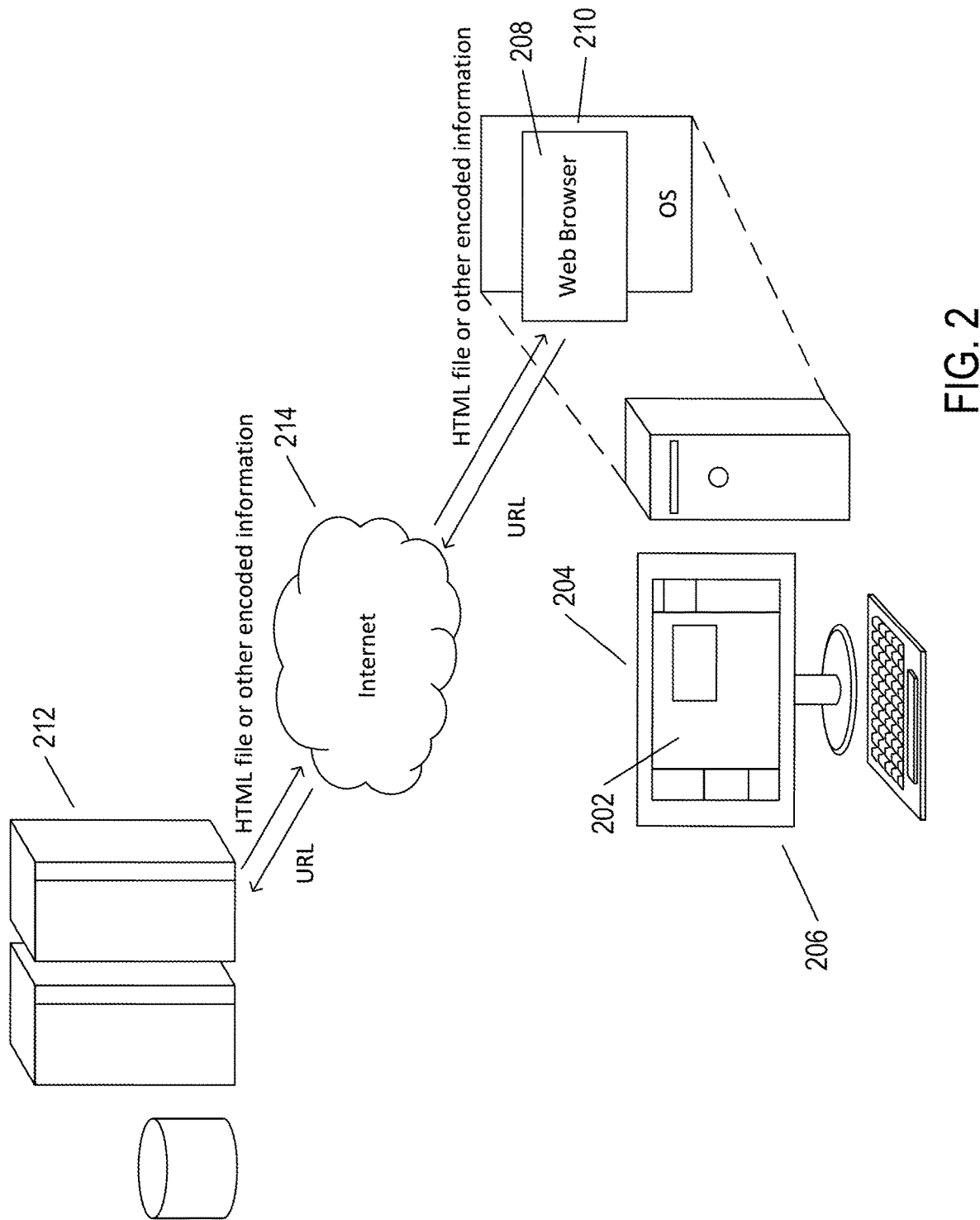
FIG. 2 illustrates typical electronic information provision and information consumption.

FIG. 2 illustrates typical electronic information provision and information consumption. In FIG. 2, a web page 202 is displayed on the display device 204 of a personal computer 206. The web page generally contains a variety of different types of information, including text, photographs and graphics, animations, and even streaming video. The displayed web page 202 is generated by a web-browser application 208 that executes within an execution environment provided by an operating system 210 executing on a processor or processors within the personal computer 206. The information used by the web browser to generate the displayed web page is obtained by the web browser from generally remote computational entities using the hypertext transfer protocol ("HTTP"), the real-time streaming protocol ("RTSP"), and other such information-transfer protocols that are generally implemented above the well-known transmission control protocol ("TCP") and Internet protocol ("IP"). In the HTTP protocol, commonly used for providing the information from which displayed web pages are generated by web browsers, the web browser accesses information by specifying a universal resource locator ("URL") or, more generally, a universal resource identifier ("URI"), for each discrete information entity, such as a file, in an HTTP GET request to a remote server 212 interconnected with the web browser via the Internet 214 and receives the requested file or other information entity from the remote server according to the client/server HTTP protocol. The RTSP protocol is used to request and receive streaming video for display through a media-player application program that executes in parallel with the web browser. The RTSP protocol allows the rendering and display of a video to commence prior to the completion of transfer of the corresponding video file from a remote video-data source to the media player, with the video rendered and displayed as video data streams over the Internet from the remote video-data source to the media player on a user's computer or other video-rendering device.

Figure 3:
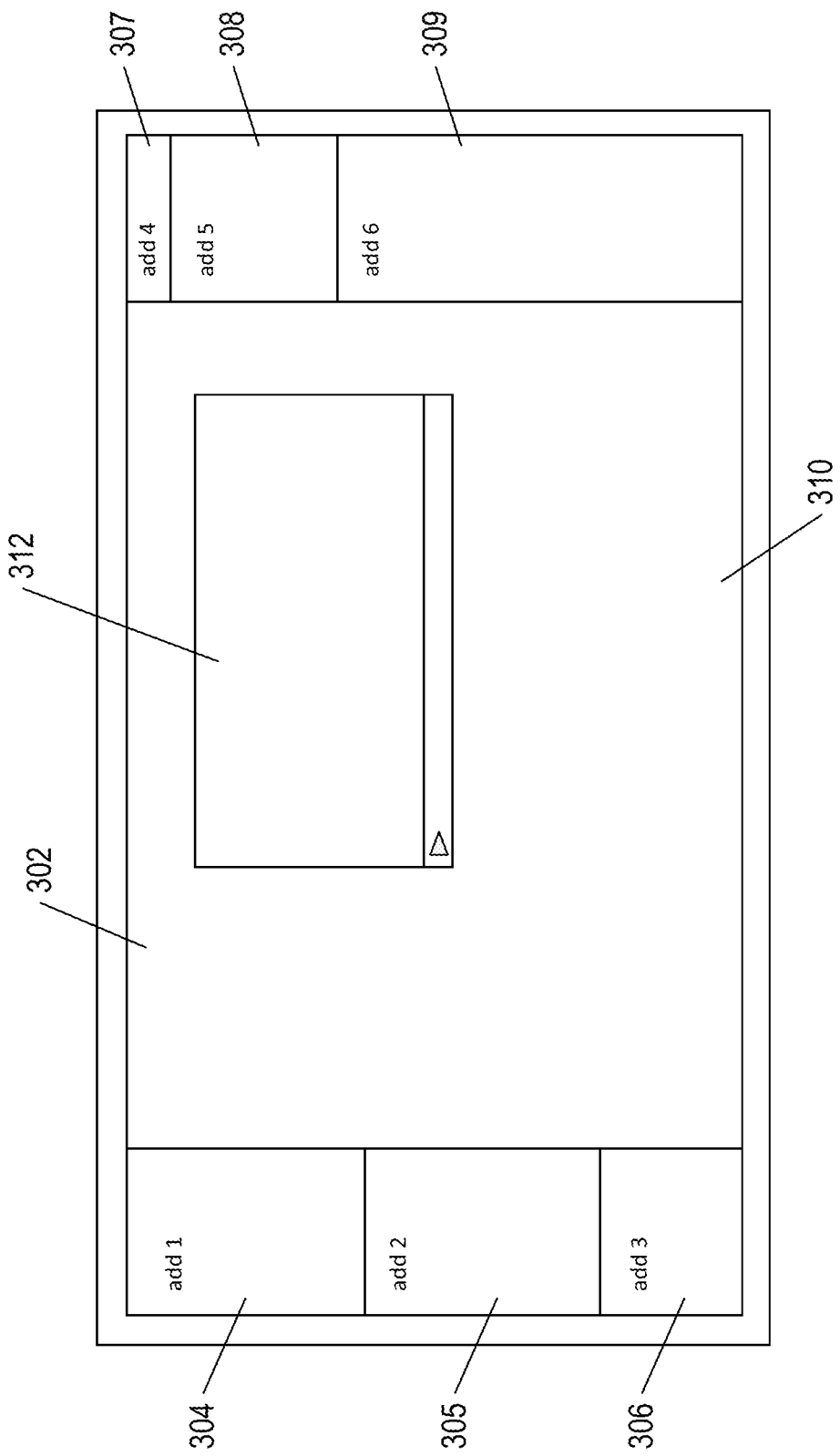
FIG. 3 illustrates a typical displayed web page through which an information consumer receives information.

FIG. 3 illustrates a typical displayed web page through which an information consumer receives information. The displayed web page 302 may be displayed over the entire display screen, as in FIG. 3, or over a window that represents a portion of the display screen. The displayed web page may include multiple subregions, including, in the web page shown in FIG. 3, multiple regions 304-309 in which advertisements are displayed, a main region in which content is rendered and displayed to the user 310, and a video-display region 312 in which a user can view a streaming video, such as a film or television program with embedded video advertising.

Figure 4:
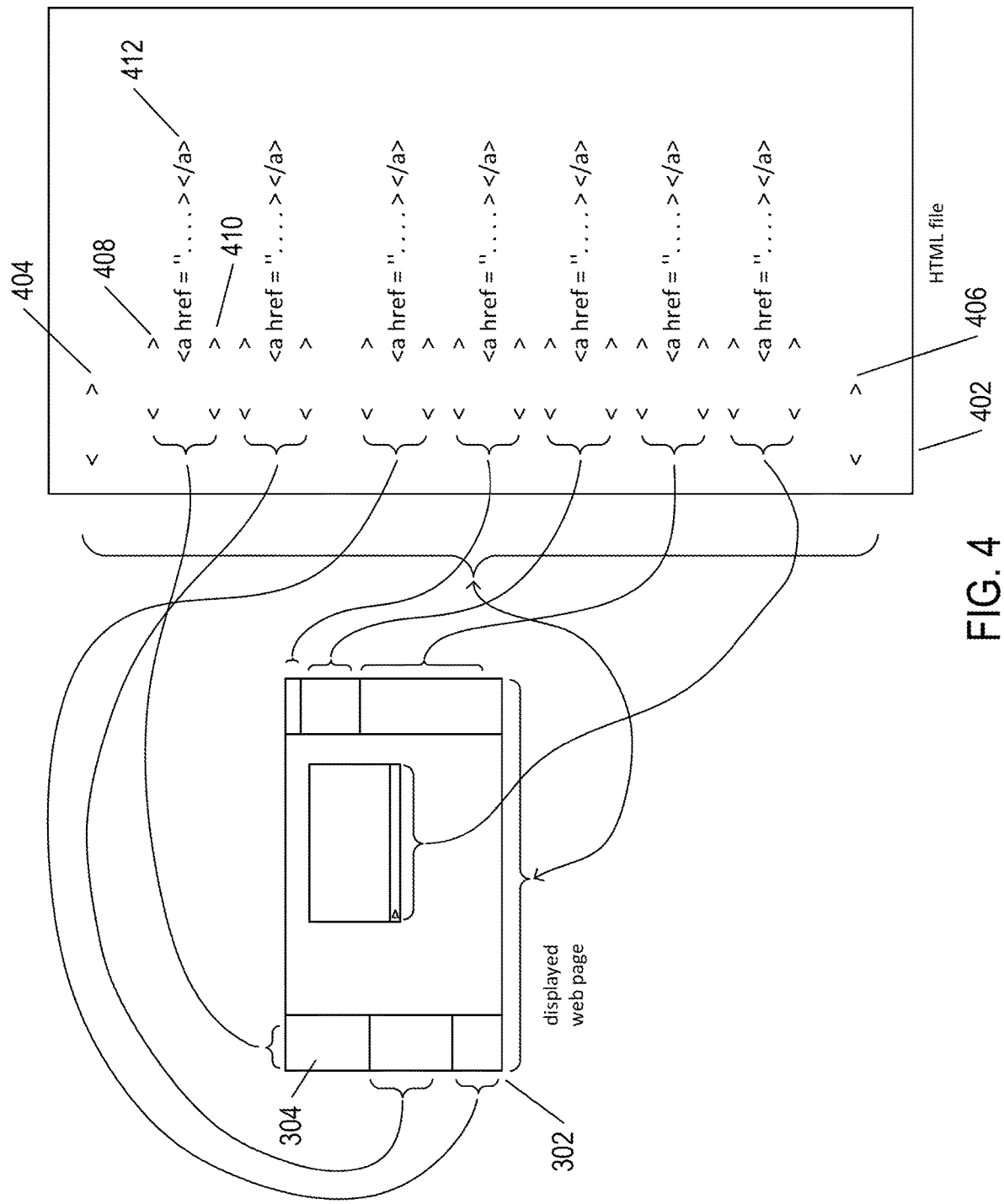
FIG. 4 illustrates specification of a displayed web page by an HTML file.

FIG. 4 illustrates specification of a displayed web page by an HTML file. In many cases, web pages are specified and described by hypertext markup language ("HTML") files. FIG. 4 shows a high-level representation of an HTML file 402 that specifies the web page 302 discussed above with reference to FIG. 3. An HTML file is hierarchically organized into hierarchical sections, each section demarcated by opening and closing tags. For example, the web page, as a whole, is described by the highest-level section demarcated by an initial tag 404 and ending tag 406. The tags generally include symbolic encodings of various HTML attributes and additional text, not shown in FIG. 4 for the sake of brevity and clarity in illustration. A detailed description of the HTML web-page specification language can be found in any of various textbooks and on-line references, including Wikipedia. Each section of the web page is generally specified by a lower-level tag-demarcated section, such as the section bracketed by tags 408 and 410 corresponding to advertisement 304. Often, the content for the subsections, such as advertisement 304, are specified by one or more additional HTML files referenced by a hyperlink, such as hyperlink 412, within the HTML file 402 specifying the web page. These hyperlinks generally include URIs or URLs, not shown in FIG. 4, allowing the web browser to obtain the files through additional HTTP-based client/server transactions.

Figure 5:
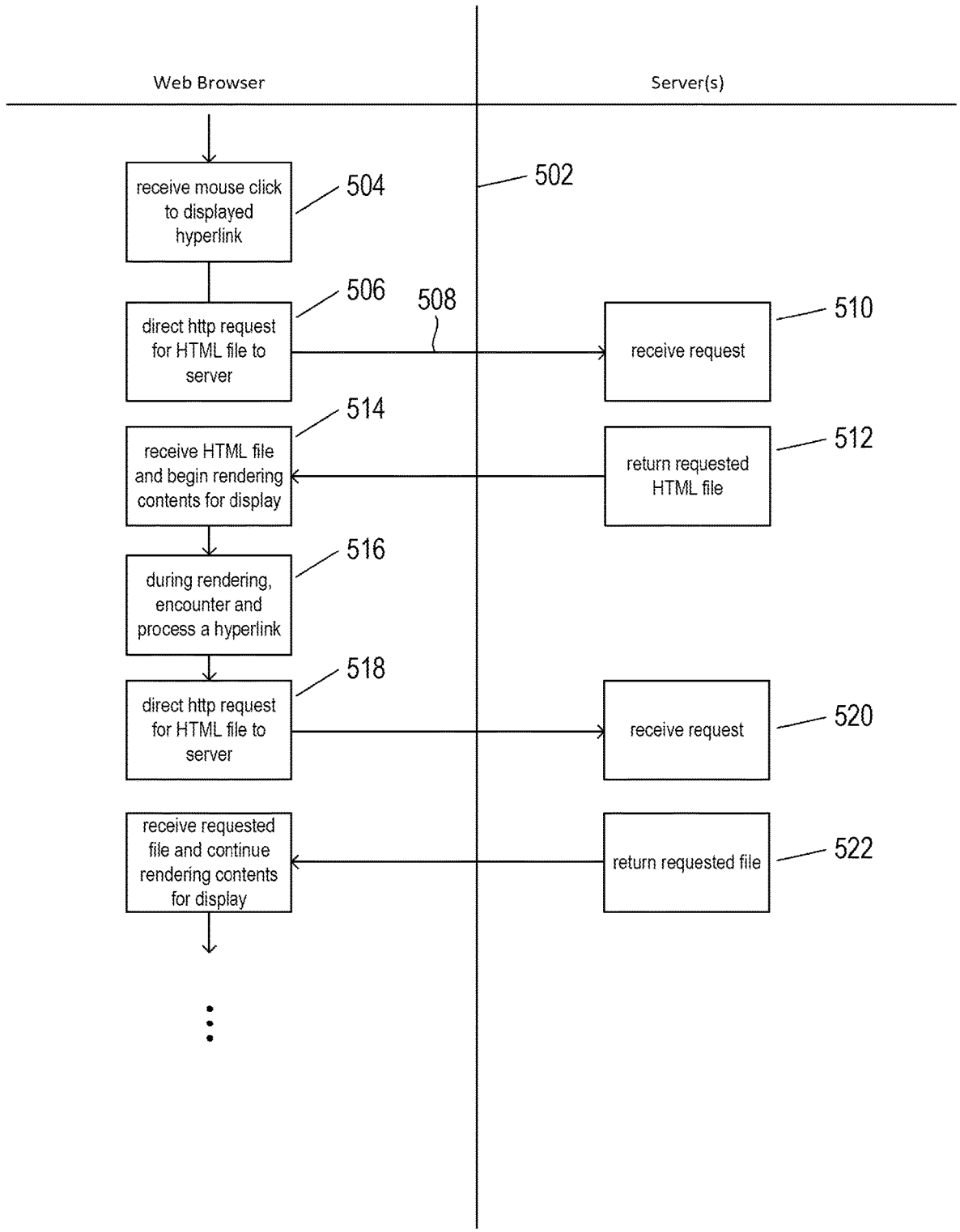
FIG. 5 illustrates, using a control-flow-diagram-like illustration, the process by which a web browser renders a web page for display.

FIG. 5 illustrates, using a control-flow-diagram-like illustration, the process by which a web browser renders a web page for display. In FIG. 5, as in many additional figures discussed below, interaction between two different entities is illustrated with the steps of a first entity located to the left of a central vertical line 502 and steps associated with a second entity located on the right of the central vertical line 502. In the case shown in FIG. 5, the left-hand portion of the figure shows steps carried out by a web browser executing on a user's personal computer and steps on the right-hand side of the figure correspond to steps carried out by one or more servers. In step 504, a user inputs a mouse click to a displayed hyperlink on a web page, which is transmitted to, and received by, the web browser. In response, in step 506, the web browser directs an HTTP request for an HTML file specified by a URL associated with the displayed hyperlink. That URL can be found in an encoding of the hyperlink within the corresponding HTML file for the displayed web page. In general, access to a hyperlinked web page involves a series of computational and communications activities. A web browser accesses, using the URL, a distributed name server ("DNS server") to obtain the IP address for a server that serves the HTML file and then transmits an HTTP GET request to that server. All of these underlying activities are represented, in FIG. 5 and subsequently described figures, by horizontal arrows, such as horizontal arrow 508. When the server receives the HTTP GET request 510, the server uses the URL embedded in the GET request to find and return the requested HTML file to the requesting web browser 512 via the HTTP client/server protocol. The web browser receives the HTML file in step 514 and begins rendering the file for display by generating display commands and display data from the HTML directives within the HTML file. During rendering of the HTML file, the web browser may encounter embedded hyperlinks, as in step 516. When the web browser encounters an embedded hyperlink, the web browser prepares and directs an HTTP request for the HTML file described by a URL encoded in the embedded hyperlink, in step 518, to a remote server which receives the request, in step 520 and returns the requested file in step 522. The embedded hyperlinks reference files stored in either the same server from which the HTML file describing the web page is received or from other remote servers. In general, the display commands and displayed data generated by the web browser as the HTML file is processed are executed via system calls to the operating system and other executables within the personal computer to generate the web-page image displayed to the user on the display device.

Information markets to which the current application is directed may distribute information electronically via HTTP, RTSP, and web pages, but may also employ many other information distribution, information rendering, and information display technologies. The distribution of information electronically via HTTP, RTSP, and web pages is used in the current discussion as an example of many possible information distribution, rendering, and display technologies on which information markets can be based. Some other technologies include distribution of books and magazines to eReaders and distribution of recorded music by electronic file transfer to music-player applications.

Currently, advertisements are included along with content on web pages by content providers, with web-page viewers having no direct control over the advertisements that they receive. In most cases, content providers provide content at no cost to viewers, but are compensated for advertising space they provide to advertisers on their web pages. In many cases, sophisticated content providers and advertisers may cooperate to include targeted advertising within web pages based on information accumulated, over time, about particular users, with the users identified by the IP address from which requests for web pages are received and by other means. It is no accident that web-browser users are commonly presented with advertisements related to goods and services they have recently researched on the Internet. However, the targeting of advertising is generally relatively crude because both content providers and advertisers lack detailed market-segment information about individual web-page readers.

In certain cases, users pay subscriptions to content providers in order to receive content from particular web sites or other information-distribution services. However, in general, information is provided at no cost to users on the Internet in the hopes that advertising included in web pages will be sufficiently attractive to users for the users to input mouse clicks to navigate through hyperlinks included in advertising to obtain additional information about advertised products and services. These click-through events are detectable by advertisers and the basis for many compensation schemes by which content providers receive revenues from advertisers.

Both subscription-based information provision and advertiser-compensated information provision may represent relatively inefficient information distribution from the standpoint of information providers. In the case of subscription-based information provision, it may be difficult for content providers to determine subscription rates in order to maximize income and, in general, subscription rates are commonly applied to all subscribers and potential subscribers. In the case of advertiser-compensated information provision, despite efforts for targeting advertisements, the rate of click-through events associated with advertisement-embedded hyperlinks may be highly variable and may be significantly lower than could be achieved were precise targeting possible. Moreover, there is generally a large population of Internet users who completely disregard advertising and therefore receive the benefits of information provided by information providers without paying anything for them.

In many additional types of markets, retailers, distributors of goods and services, and others who seek to provide goods and services to consumers face significant challenges in attempting to evaluate particular potential purchasers' ability and desire to purchase the offered goods and services. Providers of goods and services may waste significant time attempting to market products to those who are insufficiently interested in the offered products to purchase them, even at discounted prices. Providers of goods and services may also waste significant opportunities by failing to recognize potential consumers who would purchase products were a suitable price offered. In many cases, sales at discounted prices may provide needed revenue and product flow, but offering discounted prices to consumers as a whole may lead to counterintuitive loss of profits as a result of setting expectations for lower prices, causing consumers to further delay purchases, and as a result of failing to sell products at higher prices to those consumers willing to pay the higher prices.

To address of the above-mentioned deficiencies and inefficiencies with current information provision over the Internet and by other electronic communications means, the current application discloses an electronic information market in which information providers and information consumers carry out information-related transactions that allow information providers and information consumers to make rational decisions and maximize the benefits they obtain by exchanging information and value in the information market. The techniques and approaches to which the current application is directed may find application in a variety of additional types of markets, in addition to the information market described below. Providers of goods and services, referred to as "products," may obtain information about individual potential consumers of the products in order to more efficiently determine pricing for the products on an individual-consumer basis. Consumers may also benefit from individual pricing by obtaining products at prices tailored to meet their abilities to purchase and by receiving advertisements and offers tailored to their specific needs and interests.

Figure 6:
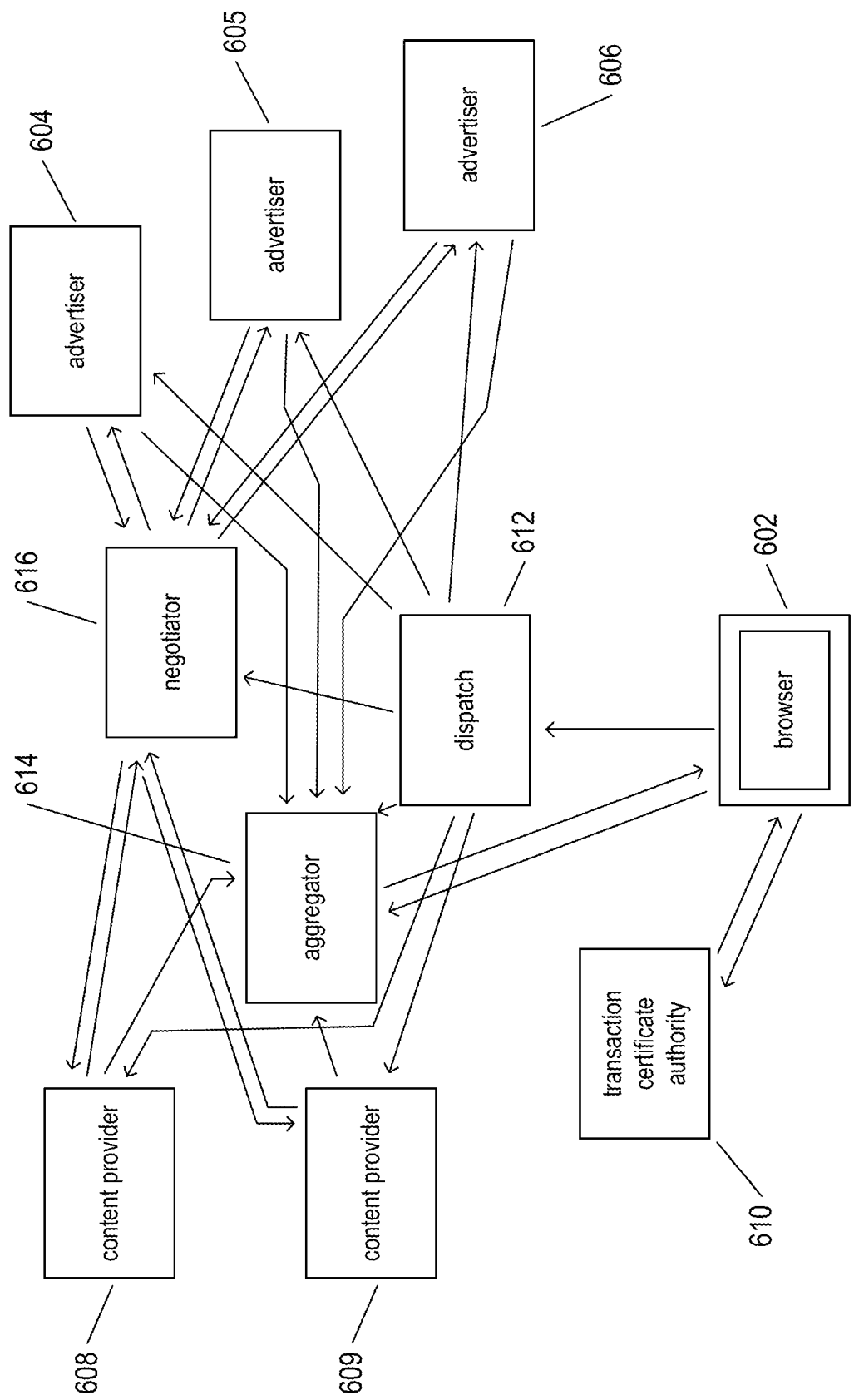
FIG. 6 illustrates one implementation of the electronic information market disclosed in the current application.

FIG. 6 illustrates one implementation of the electronic information market disclosed in the current application. This illustration includes representations of each of the number of components that together operate in order to implement the electronic information market. In many cases, although only a single component is shown in FIG. 6 for illustration clarity, the information market may contain tens, hundreds, thousands, millions or more participants and components that together cooperate to provide for transaction-based information exchange. It should be noted that, by the term "participant," the current disclosure may refer to, at times, a human participant in the information market and, more often, to processor-controlled systems and devices operating on behalf of humans, corporations, and other organizations.

Three different types of information-market participants are indicated in FIG. 6. Information consumers are referred to as "clients" or "users" and generally access information from a client computer 602 executing a web-browser application or other such information-acquiring and information-rendering application or program. There are three different types of information-providing participants shown in FIG. 6, including advertisers 604-606, content providers 608-609, and consumers who participate in the market using client computers, including client computer 602. Advertisers provide advertising content that is consumed by users, or clients. Content providers provide any of many different types of information that can be acquired and rendered by a client device, with the prototypical content encoded within web pages that are accessed and rendered by web-browser applications running on client computers. However, the electronic information market may additionally encompass many other types of information provided through many additional types of electronic communications media and protocols. In addition to advertisers, content providers, and clients or users, the information market includes one or more transaction-certificate authorities 610, one or more dispatch-service components 612, one or more aggregator-service components 614, and one or more negotiator-service components 616. The transaction-certificate authority receives and verifies information about a user and returns to the user a digitally signed transaction certificate that the user subsequently employs to carry out various types of information-exchange transactions. The transaction certificate, discussed further below, uniquely identifies a user and includes a variety of different types of information about the user that can facilitate information-exchange transactions and individual pricing for information, in the electronic information market, and for products of many different kinds in additional markets. In general, the transaction-certificate authority is a remote computational entity, such as a data center or cloud-based virtual data center, accessible to client computers via the Internet. Similarly, advertisers and content providers are generally discrete, remote server computers within data centers or cloud-based virtual data centers. By contrast, the dispatch-service, aggregator-service, and negotiator-service components 612, 614, and 616, also referred to as "dispatch components," "aggregator components," and "negotiator components," may be discrete computational entities or may be executable entities included within or distributed among client computers and other information-market participants. In many implementations, the dispatch, aggregator, and negotiator-components may all execute within servers of a remote information-market data center or remote, cloud-based virtual data center.

The dispatch-service component 612 receives browser-start-up messages and access requests from client browsers, and dispatches communications corresponding to the received messages to other participants and components of an information market, as described in further detail below. A negotiator-service component 616 negotiates with advertisers and content providers on behalf of clients in order to arrive at mutually acceptable terms for various information-exchange transactions carried out within the information market. The aggregator-service component 614 combines advertising and content in order to produce, in general, advertising integrated with content that is provided to browsers executing on client computers. In certain cases, the aggregator may provide only advertising and in other cases the aggregator may provide only content rather than advertising integrated with content.

In general, the information market provides for various different information-exchange transactions, including transactions in which users agree to view advertising and receive a negotiated compensation for viewing the advertising and transactions in which users obtain content from content providers at a mutually agreeable cost. The information market additionally allows advertisers and content providers to undertake individual pricing for potential consumers based on information provided to the advertisers and content providers in transaction certificates. Additional types of transactions may include various types of accounting and billing transactions in which value is exchanged between participants of the information market to compensate participants for viewing advertisements and providing content. Of course, the currently disclosed information market does not require that content providers charge for providing content, that advertisers pay compensation to those who receive their advertisements, or that pricing is undertaken only on an individual-consumer basis. In fact, content providers can continue to provide content to users at no charge, should they desire to, and can continue to incorporate advertisements in the content in return for financial compensation from advertisers. Similarly, click-through-based compensation schemes may continue to be used. The information market provides enormous flexibility, sufficient to encompass current practices. But, the information market also provides for the ability for informed negotiation of advertisement placement and content provision at the individual user level, allowing for many different types of advertisement-targeting schemes, advertising revenue schemes, and content-pricing schemes.

Figure 7:
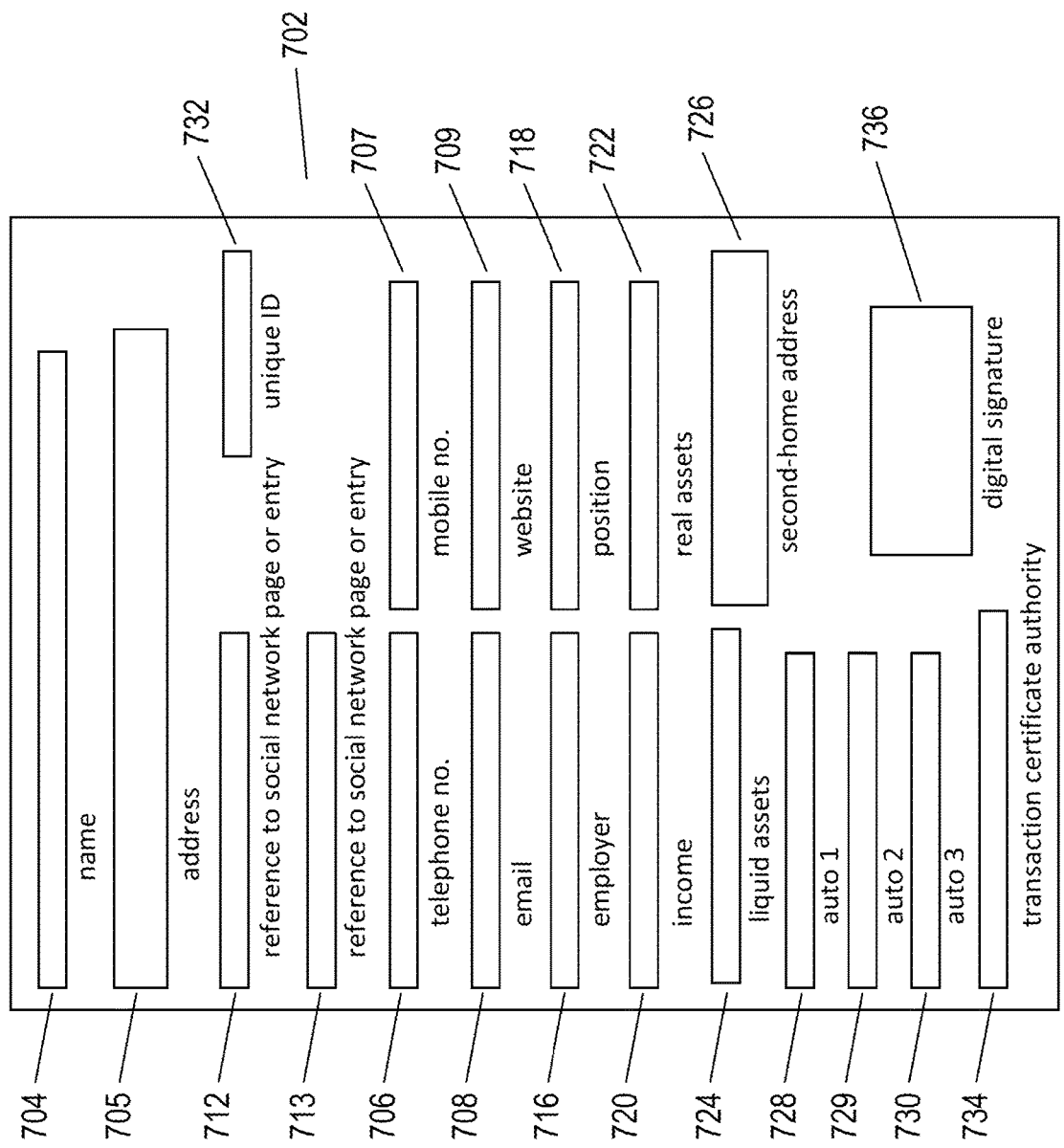
FIG. 7 illustrates an example transaction certificate.

FIG. 7 illustrates an example transaction certificate. A transaction certificate is a data structure containing various types of information that is encoded in a physical electronic memory or physical data-storage device, such as a magnetic disk or optical disk. Transaction certificates are transferred through electronic communications from a physical memory or physical data-storage device of one processor-controlled device to another. There are a variety of different possible encoding strategies by which the information contained in a transaction certificate may be encoded and stored in a physical memory or physical device.

A transaction certificate 702 may include a variety of different types of information that characterizes a particular user or client, including the client's name 704, address 705, telephone number 706, mobile-phone number 707, email address 708, web site 709, and other identifying and contact information. The transaction certificate may additionally include URL references 712-713 to social-network pages that describe or that are associated with the user. The transaction certificate may also include additional types of information about the user, including the name or an identifier for the user's employer 716, an indication of the user's position or job title 718, an indication of the user's monthly or yearly income 720, an indication of the total real assets held by the user 722, an indication of the user's total liquid assets 724, address of the user's second home or other non-primary-residential property 726, descriptions of the user's motor vehicles 728-730, and many additional types of information that may characterize a user. The transaction certificate authority also includes a unique user ID 732 that is an alphanumeric identifier that uniquely identifies a user within the information market. Each transaction-certificate authority may generate unique IDs for users from a unique-ID range or subspace allocated to the transaction-certificate authority by the information market. In certain implementations, transaction-certificate authorities, when there are multiple transaction-certificate authorities, may cooperate to ensure each user is associated with a single transaction certificate at any point in time. In other implementations, users may acquire multiple different transaction certificates. The transaction certificate additionally contains an identifier or reference for the issuing transaction-certificate authority 734 as well as a digital signature 736 that is cryptographically secure and that serves as proof that the transaction certificate was issued by the transaction-certificate authority identified by the transaction-certificate-authority identifier 734. There are many ways to generate digital signatures, one of which is for the transaction-certificate authority to encrypt the contents of the transaction certificate, except for the digital signature, using a private key known only to the transaction-certificate authority. The transaction-certificate authority makes a corresponding public key available to requesters, allowing requesters to decrypt the digital signature to verify that the decrypted contents of the digital signature exactly match the contents of the transaction certificate. In many cases, a digital signature may be generated from a cryptographic hash of the contents of the transaction certificate rather than from the contents of the transaction certificate so that the digital signature can be encoded in a relatively small number of bytes.

Figure 8:
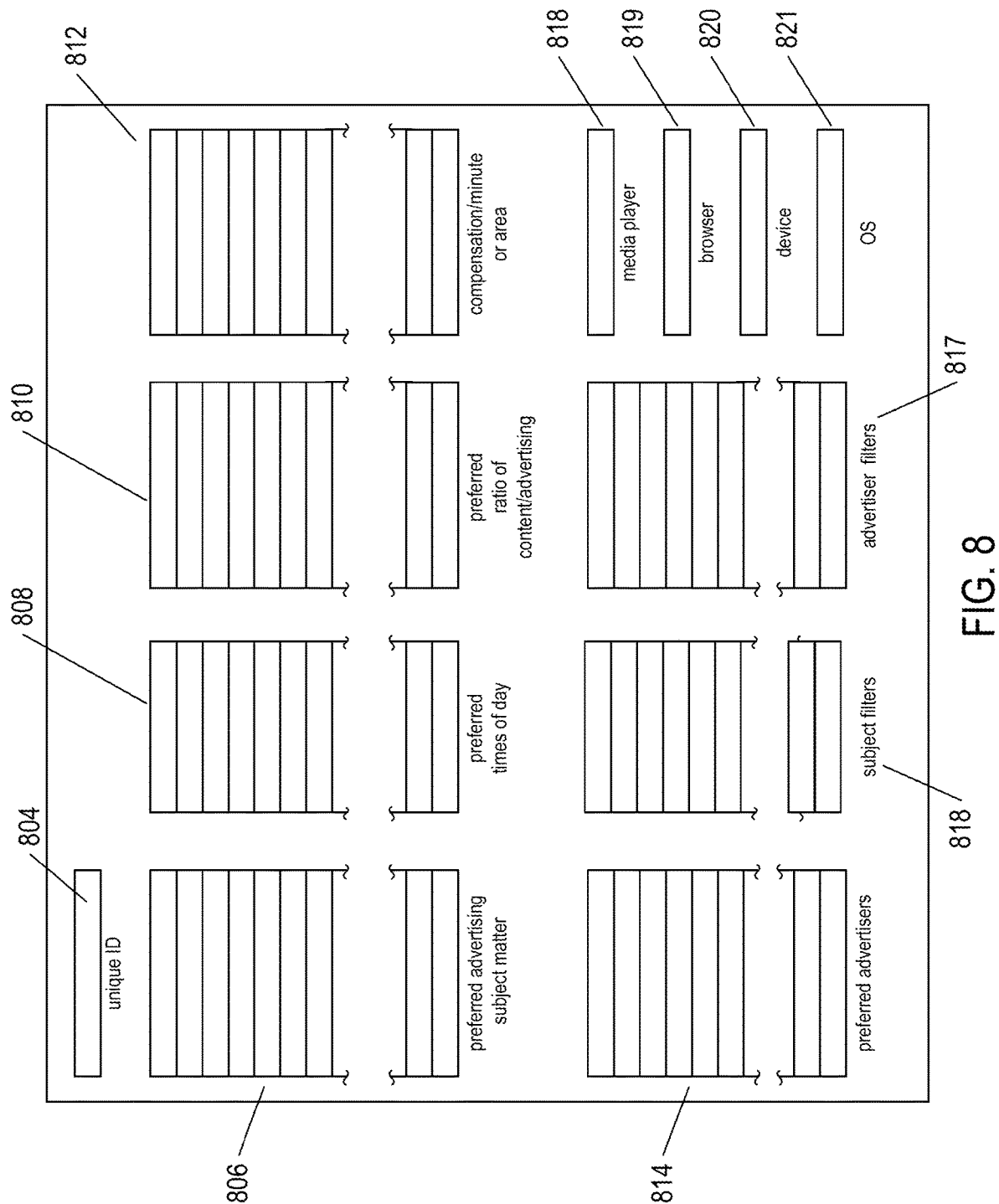
FIG. 8 illustrates an example of a user-preferences data structure that is exchanged at certain times among participants of an electronic information market.

FIG. 8 illustrates an example of a user-preferences data structure that is exchanged at certain times among participants of an electronic information market. As with the transaction certificate, the user-preferences data structure is encoded, by various different possible encoding techniques, to digital data that is stored in physical memories and physical data-storage devices. The user-preference data structures may be transferred between participants and components of the information market through electronic communications media. The user-preferences data structure 802 includes the unique identifier for a user or client 804 along with a variety of information with respect to the user's advertising and consumption preferences These may include lists of preferred advertising subject matter 806, lists of preferred times of day during which the preferred advertising subject matter is most desirable 808, preferred ratios of content to advertising for the different preferred subject matter 810, a desired compensation per minute or web-page area that the user wishes to receive for viewing the advertisements 812, a list of preferred advertisers 814, various subject-matter and advertiser filters 816 and 817 that may be used to reject various types of advertising, and indications 818-821 of the types of media player, browser, device, and operating system employed by the user to access content. In certain implementations, there may be multiple indications in a single user-preference data structure that characterize multiple devices used by a user. In other implementations, a user may procure a specific transaction certificate for each user device. In yet other implementations, encryptions of the user's device may be separately transferred in a different type of data structure. The user preferences data structure may additionally include various types of information that characterize a user's content and content-delivery preferences.

Figure 9:
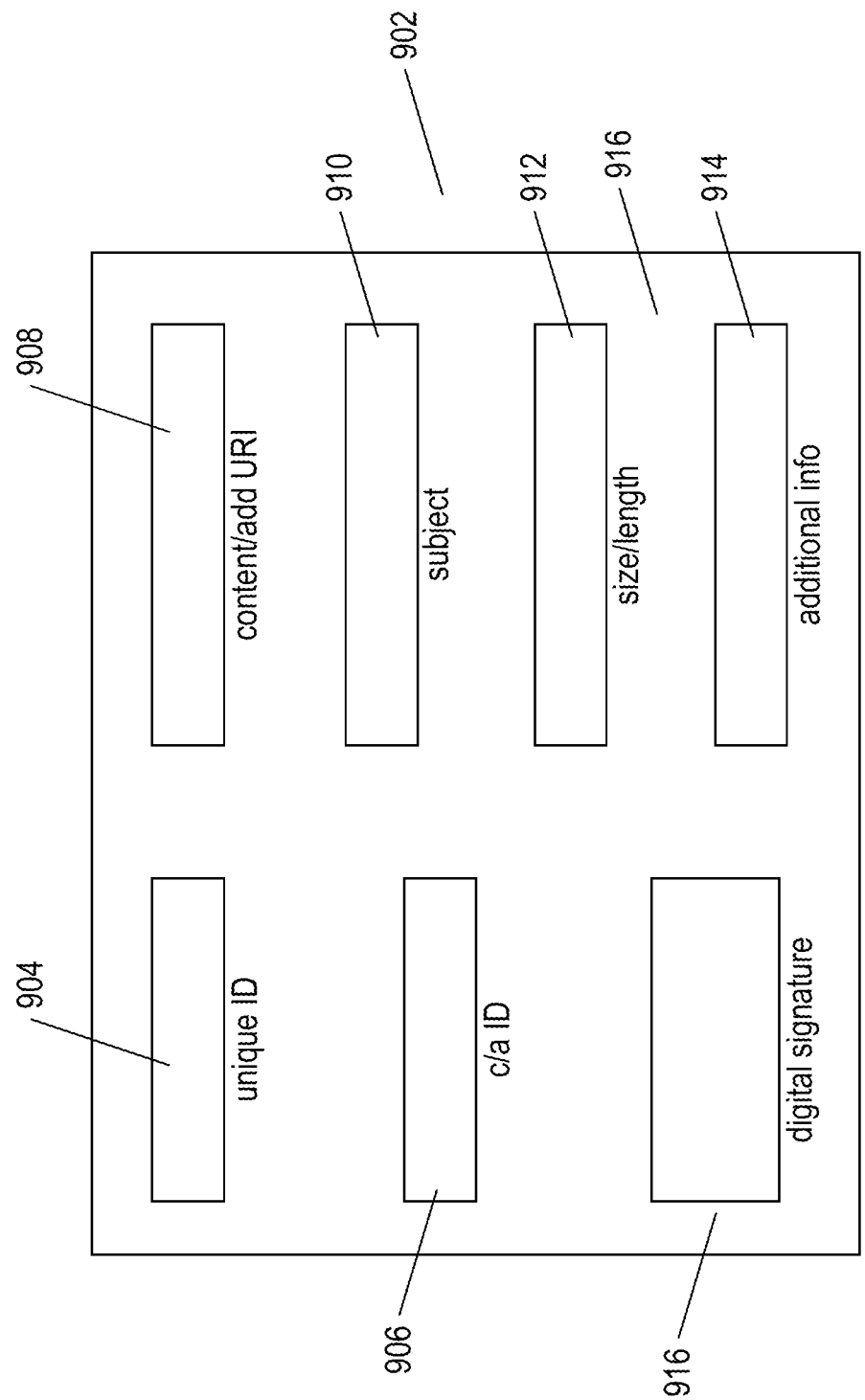
FIG. 9 illustrates an additional data structure that may be exchanged between participants and components of an information market.

FIG. 9 illustrates an additional data structure that may be exchanged between participants and components of an information market. This data structure may specify a particular advertisement or particular content provided by an advertiser or content provider. This resource data structure, like the user-preference data structure and transaction certificate, is digitally encoded by one of various different digital-encoding methods and stored in a physical memory or physical data-storage device, and may, in addition, be transferred between participants and components of the information market through electronic communications media. The resource data structure 902 includes a unique ID 904 that identifies a particular user or client, an ID that identifies a particular content provider or advertiser 906, the URI for a particular information-content file or advertising file or other information-containing entity 908, an indication of the subject matter of the content or advertising 910, an indication of the size of the content or advertising, in bytes or other data-storage units 912, and potentially additional information that characterizes the content or advertising 914. The resource data structure additionally contains a digital signature 916 to authenticate the resource data structure as having been prepared by the content provider or advertiser identified by the ID 906. Advertisers and content providers may transmit resource data structures to the aggregator component of an information market for subsequent incorporation into information entities made available to users, as discussed further below.

Figure 10:
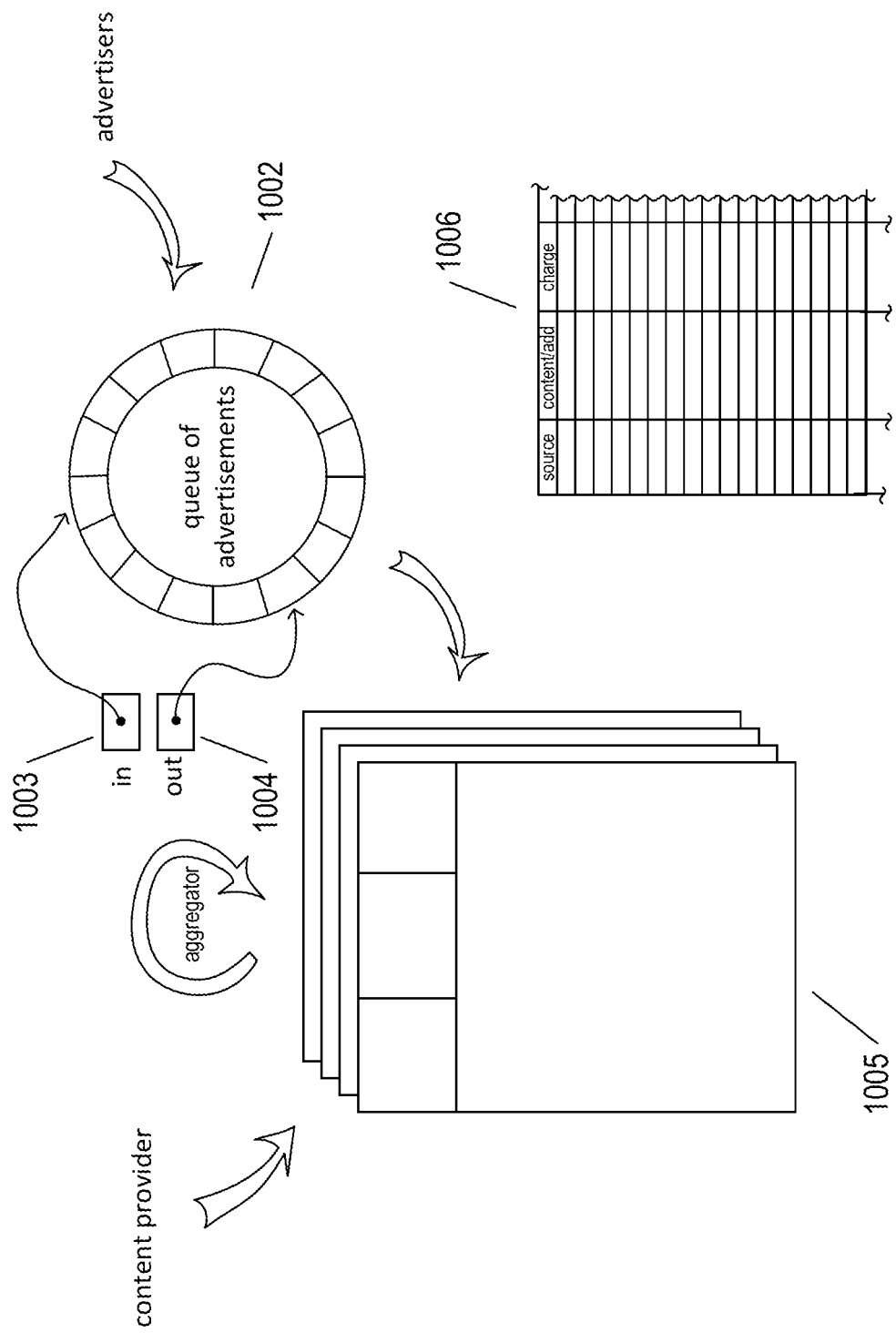
FIG. 10 illustrates internal components of the aggregator-service component (614 in FIG. 6) and general operational characteristics of the aggregator-service component of an information market.

FIG. 10 illustrates internal components of the aggregator-service component (614 in FIG. 6) and general operational characteristics of the aggregator-service component of an information market. For each active client or user, the advertising service generally includes a queue of advertisements 1002 that stores advertisements transferred to the aggregator by advertisers. In one implementation, the queue may contain URIs transferred in resource data structures by advertisers to the aggregator component. In FIG. 10, the queue is shown as a circular queue with in 1003 and out 1004 pointers. Circular queues are commonly used for buffering continuously or intermittently received information. In general, the aggregator accumulates advertisements in a particular queue 1002 directed to particular users and incorporates the advertisements into content provided by content providers to generate one or more web pages 1005 that incorporate advertising within content for transfer to and viewing by users. The aggregator may order entries within the queue, in certain implementations, based on a variety of different criteria. The entries may be ordered by time of reception, by placement bids made by the advertisers to the aggregator, by preferences indicated by the potential consumer, and by many other criteria. In addition, the aggregator contains one or more accounting data structures 1006 in which the aggregator accumulates indications of content, advertisements, and associated compensations provided to the aggregator by advertisers and content providers on behalf of users. The accounting information can subsequently be used to determine compensation owed to information-market participants by other information-market participants and to arrange for transfer of value among information-market participants to reconcile balances. This accounting information can be used along with recorded click-through events to implement click-through-event-based advertising compensation schemes. During normal operation, the aggregator may offset compensation owed to a user by advertisers furnishing advertisements viewed by the user and compensation owed by the user to content providers to generate net compensations owed to the user by advertisers and/or owed by the user to content providers. For example, if a user is provided one or more web pages that include ten advertisements for which the user is paid ten cents per advertisement to view, and the one or more web pages includes content that the user has agreed to purchase from a content provider for one dollar, the net charge to the user is zero. In this case, the advertisers furnishing the advertisements owe one dollar to the content provider. The various compensations recorded in the accounting table or tables 1006 may be periodically processed, for example, on a daily, weekly, or monthly basis, in order to arrange for the transfer of value corresponding to net accounting balances among information-market participants. Value transfers involve exchange of currency or financial instruments, through financial institutions, or may involve transfer of other types of value, including services, information, and various types of material goods and products. The accounting tables may also include additional information that can be used to generate reports that are furnished by the information market to content providers and advertisers to facilitate subsequent transaction negotiations and other information-market activities. For example, advertisers may be interested in the ratio of the number of advertisements furnished to particular users via the aggregator component to the number of advertisements actually incorporated into content accessed by the users in order to judge a user's efficiency in consuming advertisements. In certain implementations, click-through data may be accumulated by the aggregator in order to better inform advertisers of users' interest in the advertisements furnished by advertisers. Content providers may also obtain reports to assist content providers in understanding the market for content provided by the content providers.

Figure 11:
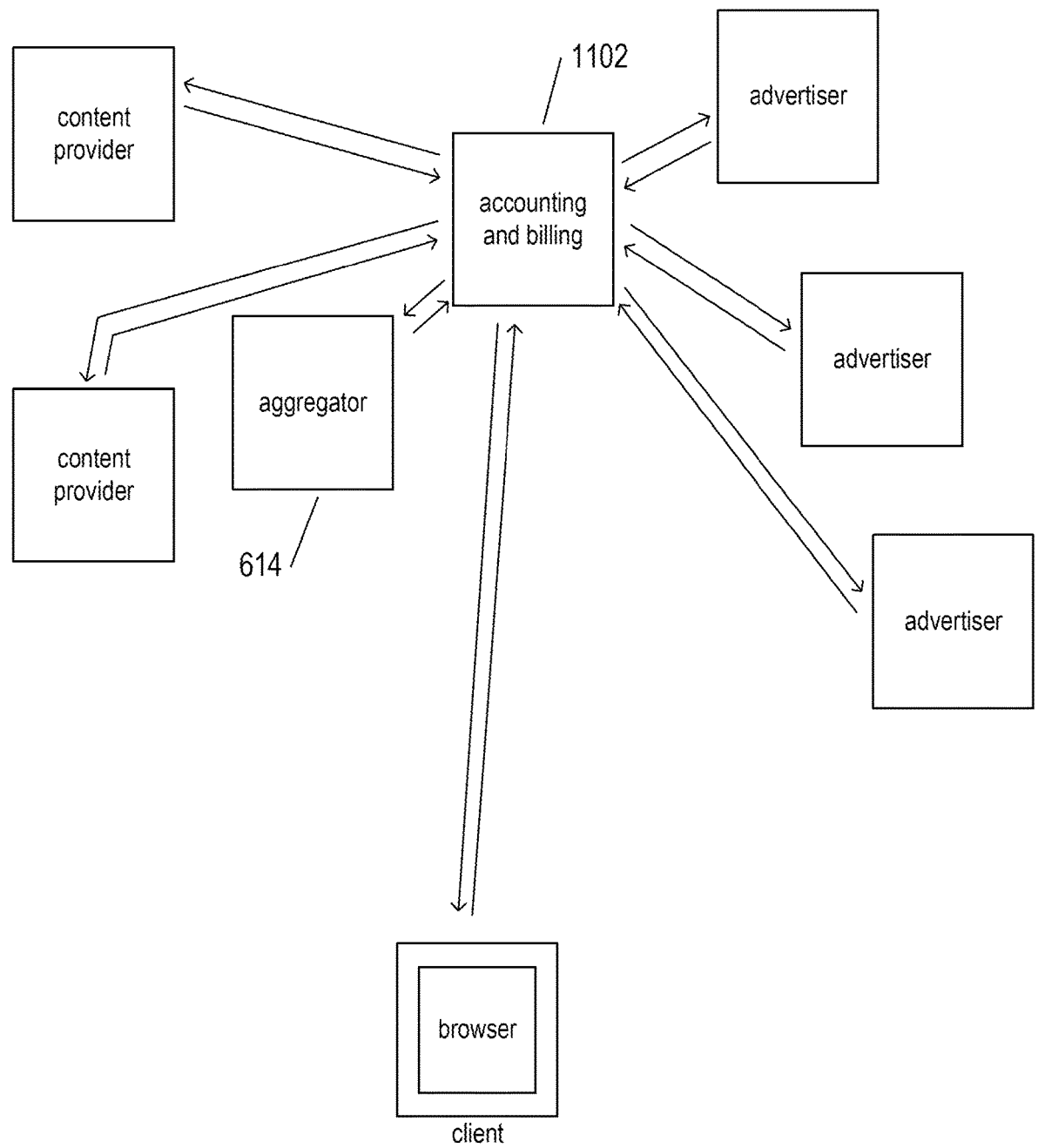
FIG. 11 illustrates an additional component of the information market not illustrated in FIG. 6.

FIG. 11 illustrates an additional component of the information market not illustrated in FIG. 6. The information market, as shown in FIG. 12, additionally includes an accounting and billing service 1102 that mediates accounting and billing based on the accounting information accumulated by the aggregator-service component 614. As with the dispatch, aggregator, and negotiator-service components, the accounting and billing service 1102 can be implemented as a distributed service, can be implemented within a single remote data center or virtual data center, or may be incorporated within the computing systems and devices of various information-market participants and/or financial intuitions. The accounting and billing service 1102 is generally, like the transaction-certificate authority (610 in FIG. 6), implemented as a distinct and separate computational entity rather than included in the systems and devices associated with information-market participants.

The electronic information market, to which the current application is directed, is characterized by the fact that information exchanges are negotiated on an individual basis. Because of the negotiated nature of information exchanges, users may not only be compensated for viewing advertisements, but may furnish information to potential advertisers to allow the potential advertisers to accurately target advertising to selected market segments. Rather than paying content providers to insert advertisements without precise and reliable targeting ability, the advertisers are able to precisely target ads to individuals willing to view them. Furthermore, advertisers can vary the compensation they pay to viewers based on various criteria. For example, when an advertiser identifies an information-market user who may likely influence others to view the advertisement or consider purchasing the advertised goods and services, the advertiser may be willing to pay out significantly higher compensation than in the case of a user who is unlikely to generate secondary advertisement opportunities. As another example, advertisers may alter advertised prices to attract potential consumers interested in purchasing a product but unable to purchase the product at the generally offered price. As yet another example, compensation for viewing advertisements may consist of price discounts with respect to standard or list pricing. Links to social-networking pages are included in the transaction certificate, in one implementation, and advertisers may employ various social-networking metrics to ascertain the likelihood that the advertisement may be secondarily distributed by a particular user. As another example, advertisers may be willing to pay higher compensation during the initial phases of a marketing campaign than during later phases of the campaign, when particular advertisements have already reached a relatively wide audience. The flexibility of negotiated advertisement provision and negotiated compensation generally allows for a wide variety of different optimization strategies to allow advertisers to most effectively reach a desired audience at lowest possible cost. Similarly, because content provision is also negotiated, content providers are provided flexibility in pricing and preciseness in identifying those who access the provided content in order to optimize content provision through the electronic information market. As one example, a content provider may initially charge low or no fees to new content consumers in order to attract new consumers to particular web sites or other content-distribution facilities. As another example, content providers may alter content provided to individuals based on the individuals' characteristics obtained from the transaction certificate and from information sources accessible through the transaction certificate, including social-networking pages. As yet another example, advertisers may offer individual pricing to individual consumers. Users may also greatly benefit from the flexibility of the information marketplace. Users can define parameters used during the negotiation process to maximize compensation they receive by agreeing to view advertisements in order to obtain desired content as inexpensively as possible. Furthermore, in bargaining with content providers, users may obtain content at lower cost, particularly when users are willing to be flexible with regard to how and when they access content.

Next, various different transactions carried out in one implementation of the information market, discussed above with reference to FIGS. 1-11, are described with reference to control-flow-like diagrams provided in FIGS. 12A-16B. It should be noted, at the onset, that these control-flow-like diagrams are intended to illustrate the effects of one implementation of an information market, and are not intended to provide detailed descriptions and many low-level details, including error handling and handling of many different types of special cases.

Figure 12A:
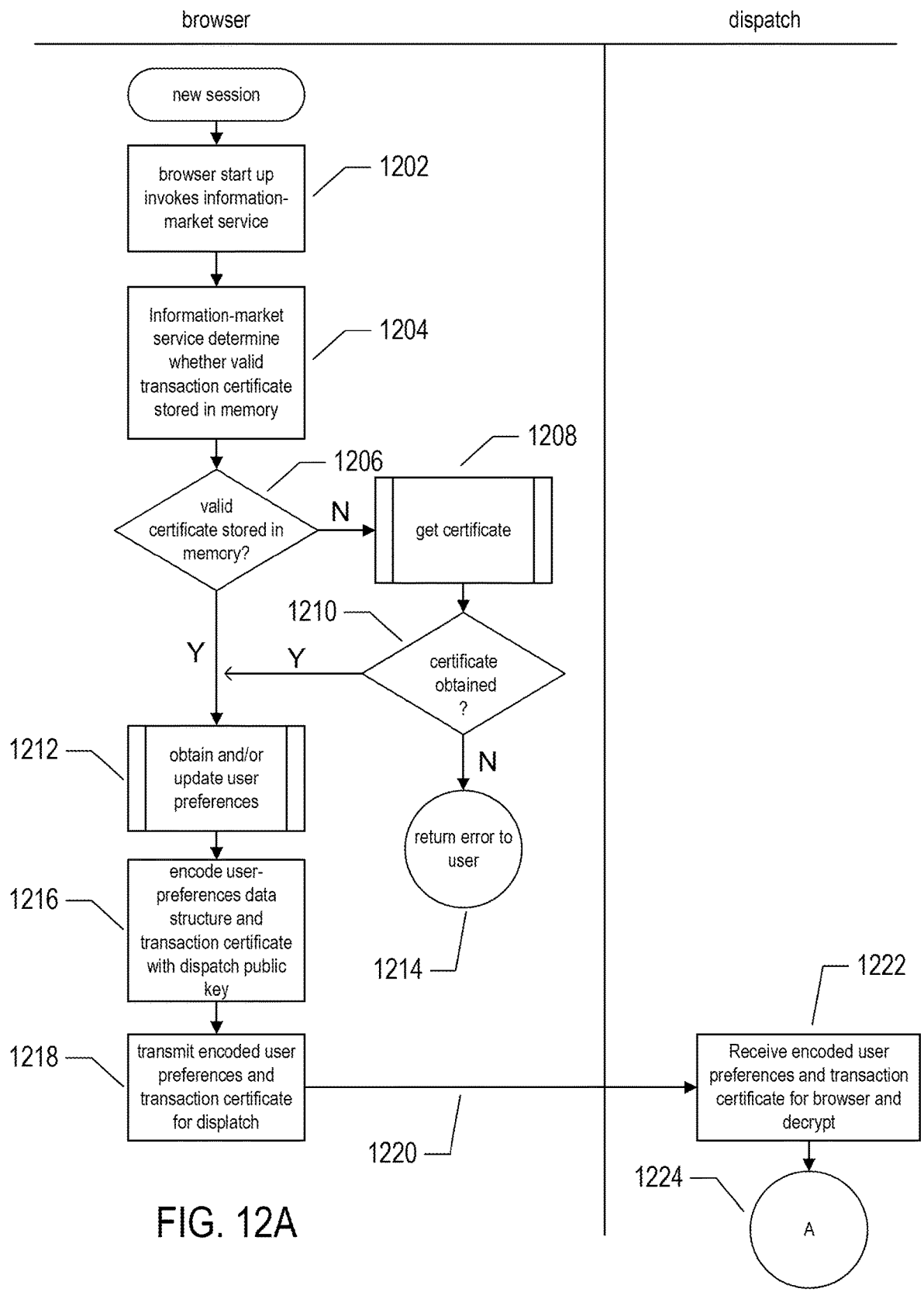
FIGS. 12A-B illustrate a "new session" routine called within a web browser when the web browser is launched on a user's computational device.
Figure 12B:
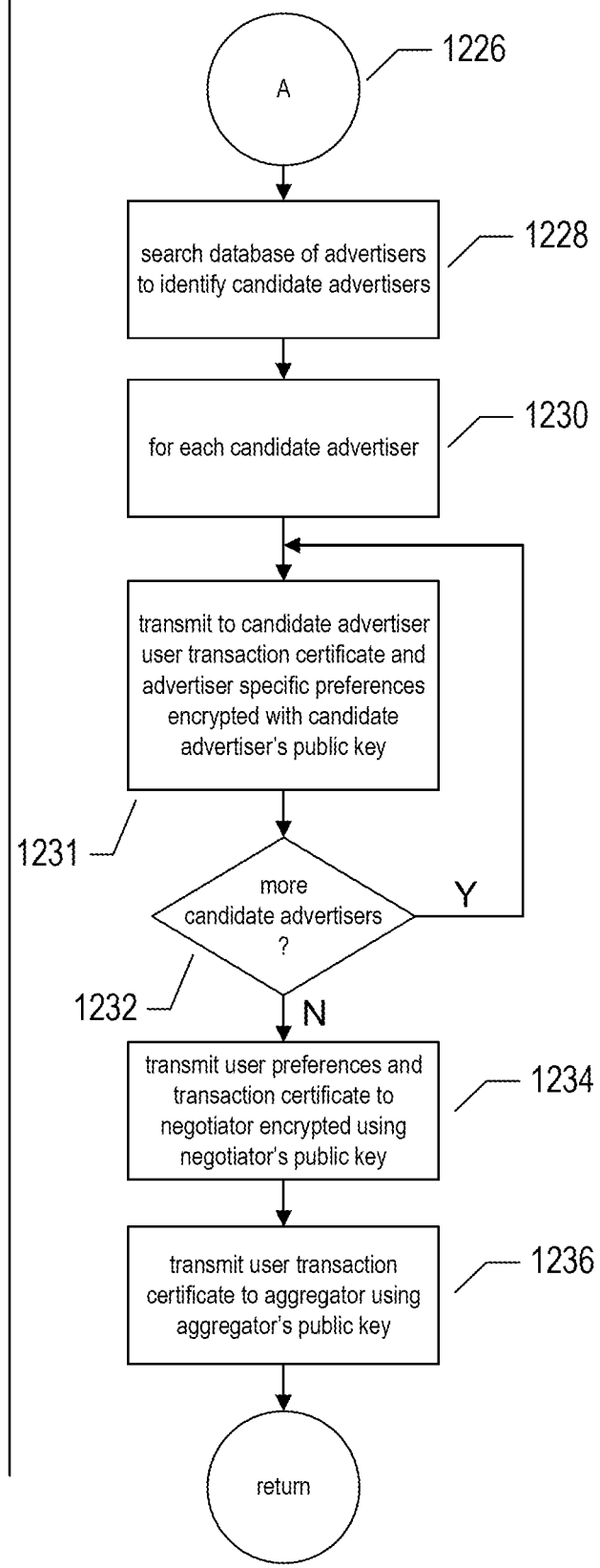

FIGS. 12A-B illustrate a "new session" routine called within a web browser when the web browser is launched on a user's computational device. When the web browser is launched, an information-market browser plug-in notifies one or more dispatch components (612 in FIG. 6) of the information market that the web browser and web-browser user are now active in the information market. In step 1202, the "new session" routine is invoked by the web-browser plug-in during the start-up process. In this and subsequent figures, the web-browser plug-in is referred to as the "information-market service" or the "local information-market service." In step 1204, the local information-market service determines whether or not a valid transaction certificate is stored in local memory. When no valid transaction certificate is present, as determined in step 1206, then a "get certificate" routine is called, in step 1208. When the "get certificate" routine successfully obtains a transaction certificate, as determined in step 1210, control flows to step 1212. Otherwise, an error is returned to the user in step 1214. In certain implementations, the routine "get certificate" may be called again with different parameters or other types of ameliorative actions may be taken. In step 1212, the information-market service obtains or updates a variety of user preferences and other user information through an information-collection interface. Any of various different types of information-collection interfaces may be used, including text-entry pages and other such information-entry facilities. In step 1216, the user preferences and characteristics are encoded in a user-preferences data structure, and this data structure and the transaction certificate are combined and encoded using a dispatch-component public encryption key. In this step, and in other steps discussed below, standard public/private data-encryption technologies are used, with public keys freely distributed and private keys held in confidence by various components and participants of the information market. Next, in step 1218, the information-market service transmits the encoded user preferences and transaction certificate to one or more dispatch components (612 in FIG. 6) of the information market. This data transmission is shown in FIG. 12A by horizontal arrow 1220. In step 1222, the dispatch component receives the encoded user preferences and transaction certificate transmitted by the information-market service and decrypts the received encrypted message. As indicated by the disk labeled "A" 1224 in FIG. 12A and a similar disk 1226 in FIG. 12B, the control-flow diagram continues in FIG. 12B with step 1228, in which the dispatch component searches a database of advertisers to identify candidate advertisers for the user described by the transaction certificate received in step 1222. This step may consider many different types of information. For example, the database of advertisers may list various different user characteristics that advertisers seek to match to characteristics of users in order for the advertisers to pay compensation to the users for viewing advertisements or to provide individual pricing to users, including price discounts. In other cases, a database may contain scripts or routines, or links to scripts or routines, to carry out more complicated evaluations of a user based on information contained in the user's transaction certificate to decide whether or not an advertiser would be willing to compensate the user for viewing the advertiser's advertisements. In general, advertisers often target specific market segments, and a user's transaction certificate is employed either by the dispatch component or by a combination of the dispatch component and advertisers to evaluate whether the user falls within a market segment targeted by the advertiser. In the for-loop of steps 1230-1232, the information-market service encrypts and transmits the user's transaction certificate as well as any user preferences that may apply to a particular advertiser and transmits the transaction certificate and additional preference information to each candidate advertiser identified in step 1228. Similarly, this information is also provided, in step 1234, to one or more negotiator components (616 in FIG. 6) of the information market. The user transaction certificate is provided, in step 1236, to one or more aggregator components (614 in FIG. 6) of the information market. In all cases, when information is transmitted from a first component of the information market to a second component of the information market, the information is encrypted using a public key of the second component, to which the information is transmitted.

Thus, the "new session" routine discussed above with reference to FIGS. 12A-B informs various information-market components that a user is now participating in the information market and alerts selected advertisers of the user's participation. As further discussed below, the informed advertisers can then begin negotiating to provide advertisements for viewing by the user, which are collected by the aggregator component of the information market for subsequent provision to the user. In this routine, and in the routines discussed below, a first information-market component may transmit information to one or more of each particular type of second component in the information market, depending on whether or not the second information-market component is a centralized component, a fully distributed component, or a hybrid component.

Figure 13A:
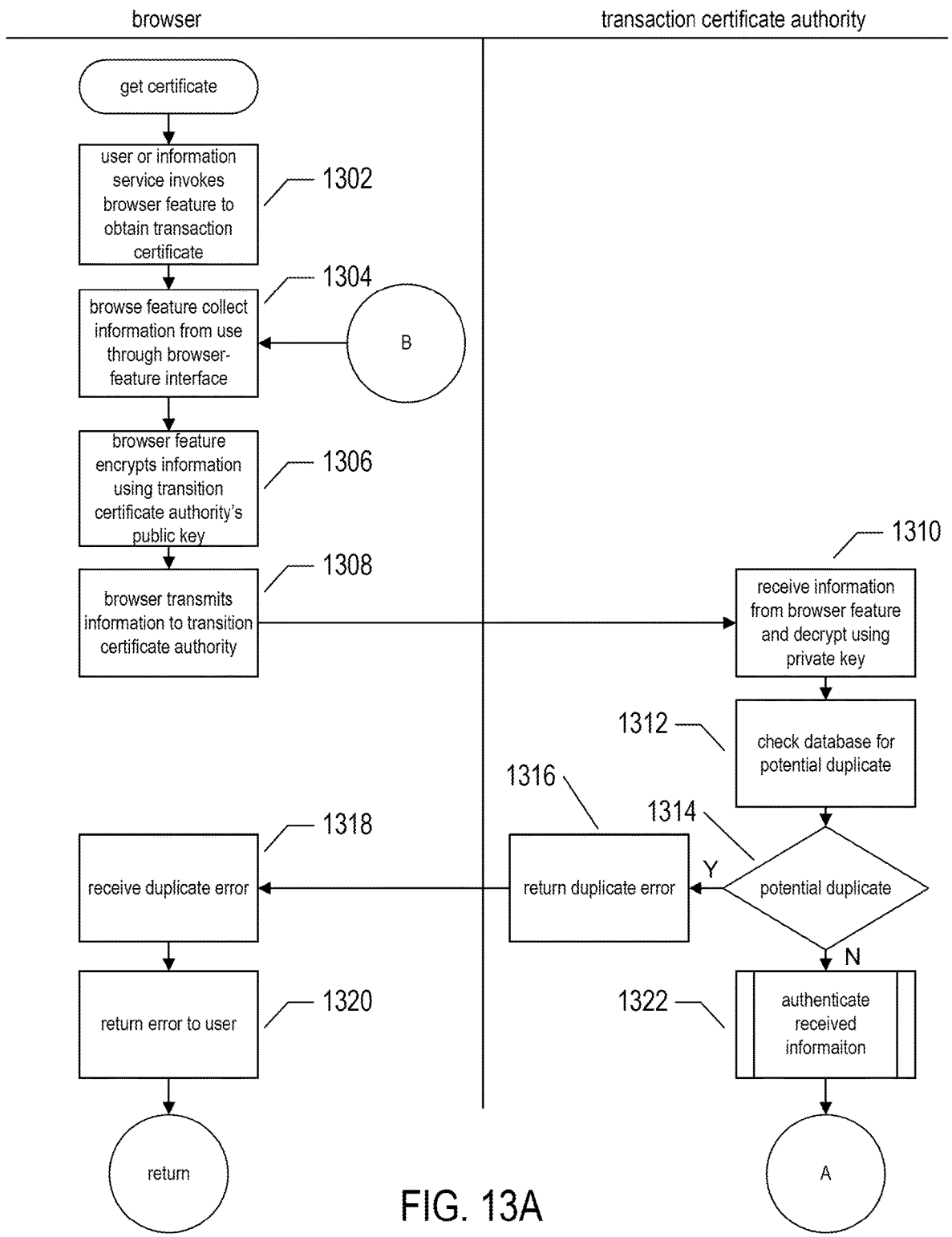
FIGS. 13A-B illustrate a "get certificate" routine called in step 1208 in FIG. 12A.
Figure 13B:
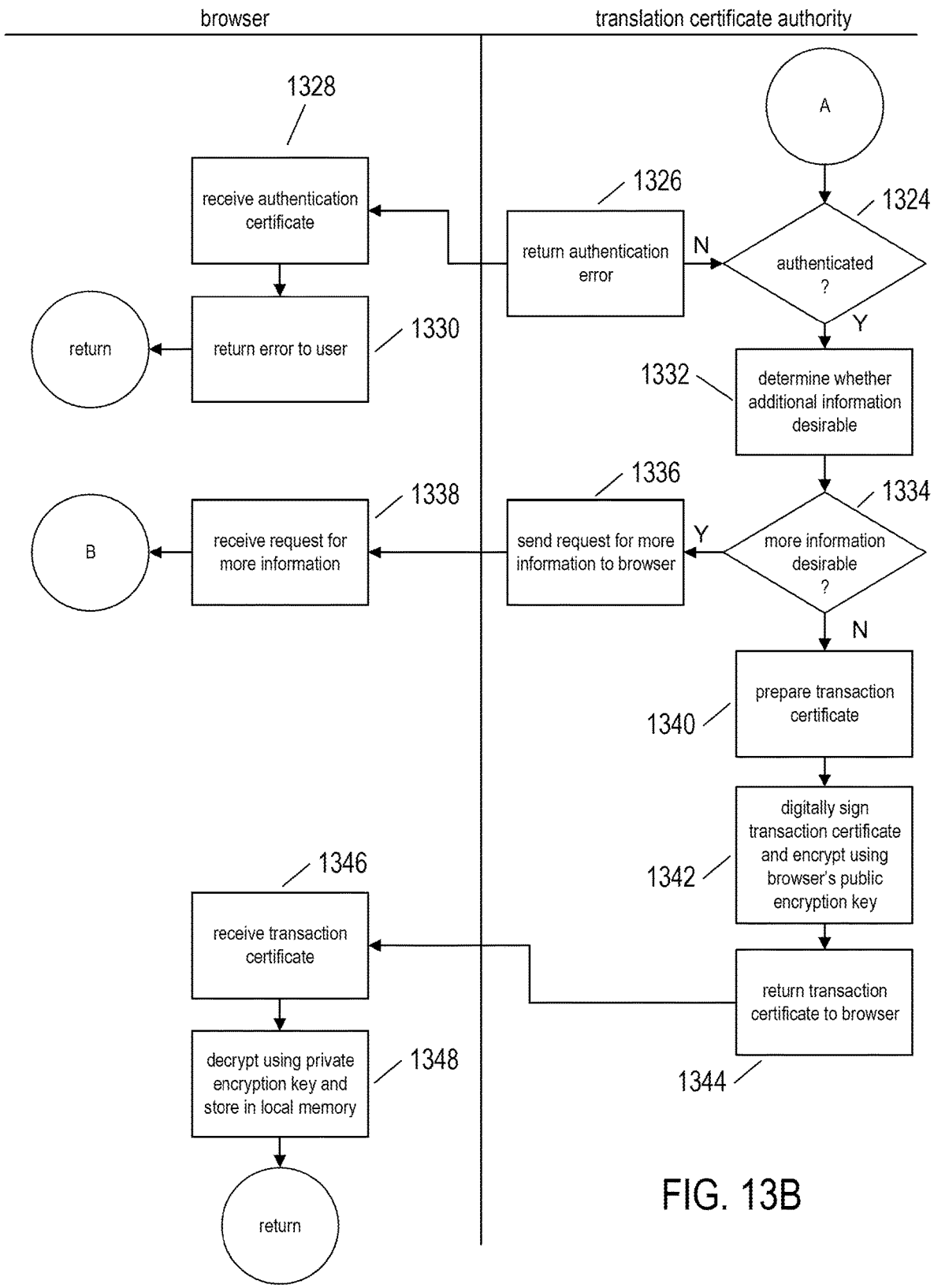

FIGS. 13A-B illustrate a "get certificate" routine called in step 1208 in FIG. 12A. In step 1302, the "get certificate" routine, referred to as "the browser feature," below, is invoked either by the local information-market service, as in FIG. 12A, or by a user inputting a mouse click to a browser-displayed input feature. The browser feature, in step 1304, collects information for the transaction certificate from a browser user through a browser-feature information-collection interface. Then, in step 1306, the browser feature encrypts the received information using the transaction-certificate authority's public key and transmits the encrypted information to a transaction-certificate authority (610 in FIG. 6) in step 1308. In step 1310, the transaction-certificate authority receives the information from the browser feature and decrypts the encrypted information using the transaction-certificate authority's private key. In step 1312, the transaction-certificate authority checks the database for information indicating a potential duplicate certificate. In this implementation, each user is allowed only a single valid transaction certificate at any given point in time. As discussed above, in other implementations, a user may hold a valid transaction certificate for each of the user's different processor-controlled devices that the user employs to access the information market and, in still other implementations, there may be other limits or constraints on transaction-certificate issuance. When a potential for a duplicate certificate is identified, as determined in step 1314, the transaction-certificate authority returns a duplicate error in step 1316 to the browser feature which receives the duplicate error in step 1318 and returns the duplicate error to the user, in step 1320, through some type of error-display interface. Otherwise, in step 1322, the transaction-certificate authority authenticates the received information. Any of many different types of authentication activities may be carried out, including evaluating references to social-networking pages, validating address, email, and telephone-number information using any of various different types of personal-information databases or services, and other such activities. When the received information is not successfully authenticated, as determined in step 1324, then the transaction-certificate authority returns an authentication error, in step 1326, which is received, in step 1328, by the browser feature, following which the browser feature returns an authentication error to the user in step 1330. When the information is successfully authenticated, the transaction-certificate authority determines, in step 1332, whether any additional information might be desirable and, when so, as determined in step 1334, sends a request for more information to the browser feature in step 1336, received by the browser feature in step 1338 with transfer of control back to step 1304 in FIG. 13A. Once all necessary information is received, the transaction-certificate authority, in step 1340, prepares a transaction certificate, digitally signs the transaction certificate, and encrypts the transaction certificate with the browser's public encryption key, in step 1342. Note that the browser's public encryption key is generally transmitted to the transaction-certificate authority in step 1308 of FIG. 13A. Alternatively, the transaction-certificate authority may obtain the browser's public encryption key from a database of browser public encryption keys maintained by the information market. In step 1344, the transaction-certificate authority returns a transaction certificate to the browser, which receives the transaction certificate in step 1346 and decrypts the certificate and stores the decrypted certificate in local memory in step 1348. In alternative implementations, the transaction certificate may be stored in encrypted form and only decrypted immediately prior to each use by the browser feature.

Figure 14A:
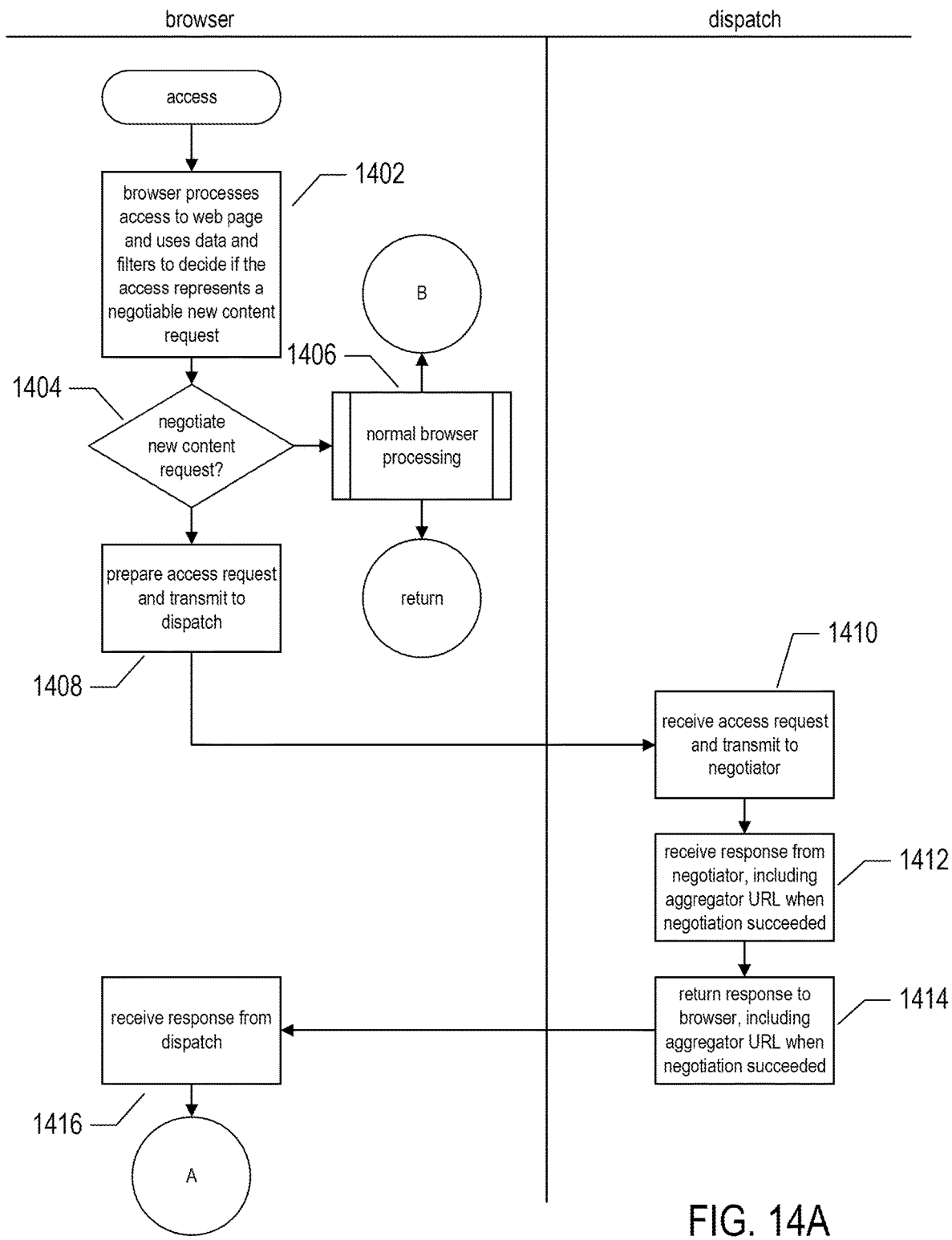
FIGS. 14A-B illustrate an access transaction by which a browser participating in the information market accesses content on behalf of an information-market user.
Figure 14B:
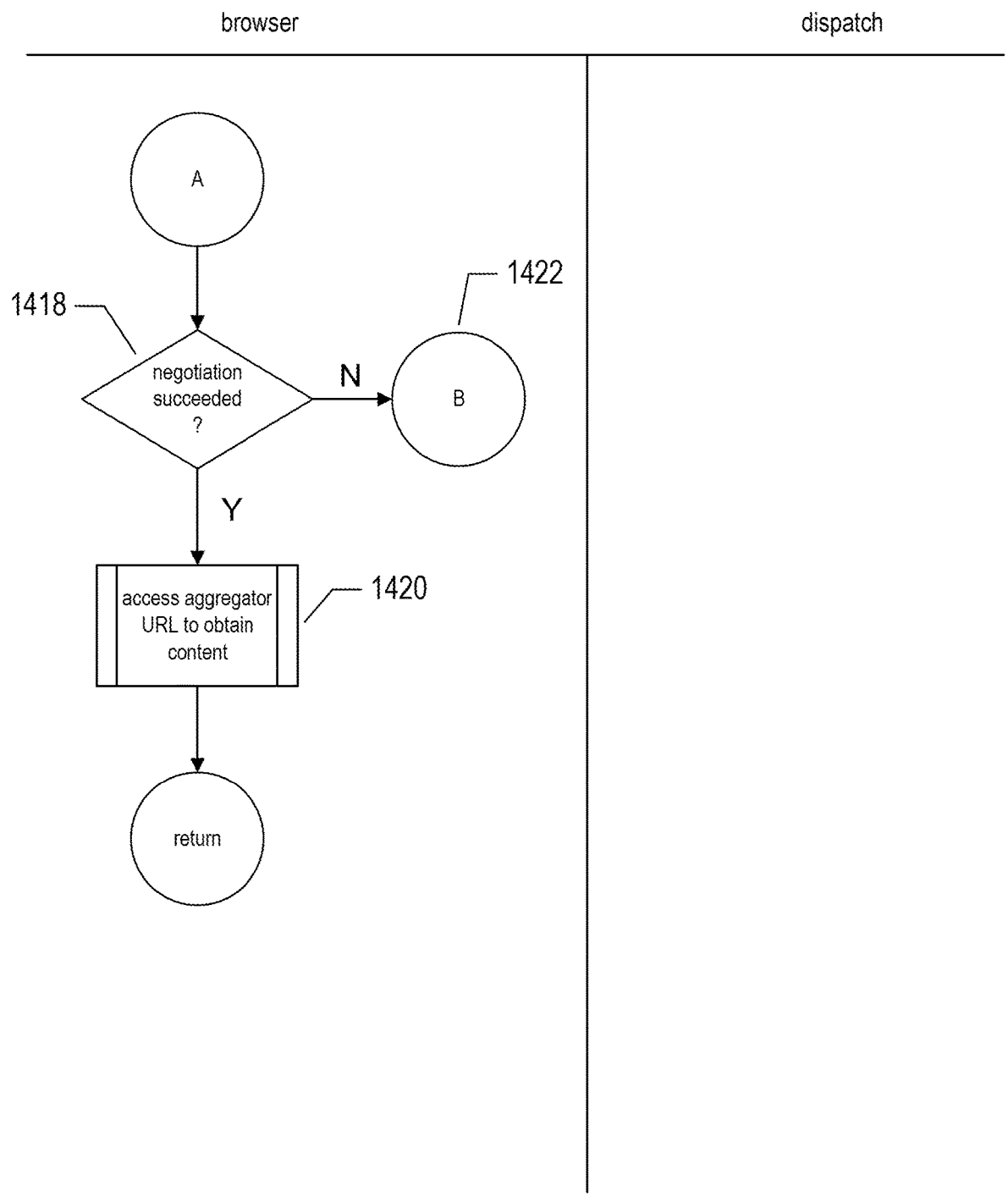

FIGS. 14A-B illustrate an access transaction by which a browser participating in the information market accesses content on behalf of an information-market user. In step 1402, a browser processes access to a web page or other such information access invoked by user input, such as input of a mouse click to a displayed hyperlink, and uses various types of data and filters to decide whether or not this access represents a negotiable new-content request. As one example, a first access to a web site may represent a negotiable new-content request, but secondary accesses within a web site may not, when information corresponding to the secondary accesses have already been prepared for delivery to the browser by one or more aggregator components (614 in FIG. 6) of the information market. As another example, access by the browser to a web site provided by a content provider not participating in the information market may clearly be deemed to not represent a negotiable new-content request. When the access is not a negotiable new-content request, as determined in step 1404, the browser accesses information in a normal fashion, external to the information market, in step 1406. Otherwise, in step 1408, the browser prepares an access request and transmits the request to one or more dispatch components (612 in FIG. 6) of the information market. The dispatch component receives the access request, in step 1410, and transmits the access request to a negotiator component (616 in FIG. 6). The negotiator component carries out a negotiation with the corresponding content provider for access to the desired information and, when a negotiation is successfully completed, returns a response to the negotiator component including an aggregator URL for the content, received by the dispatch component in step 1412, and the negotiated compensation. A response is returned by the dispatch component to the browser in step 1414 that, when a negotiation was successful, includes the URL for the content prepared by the aggregator component. This response is received by the browser in step 1416. When negotiation for the content has succeeded, as determined in step 1418 of FIG. 14B, the browser accesses the content using the aggregator URL to obtain the content in step 1420. Otherwise, the content is accessed by normal browser processing in step 1406 via step 1422. Access of the aggregator URL may involve requesting and obtaining a single HTML file corresponding to a single web page or may involve a more complex access in which multiple HTML files and web pages are received. The type and complexity of the access depends on the type of content being accessed by the web browser.

Figure 15:
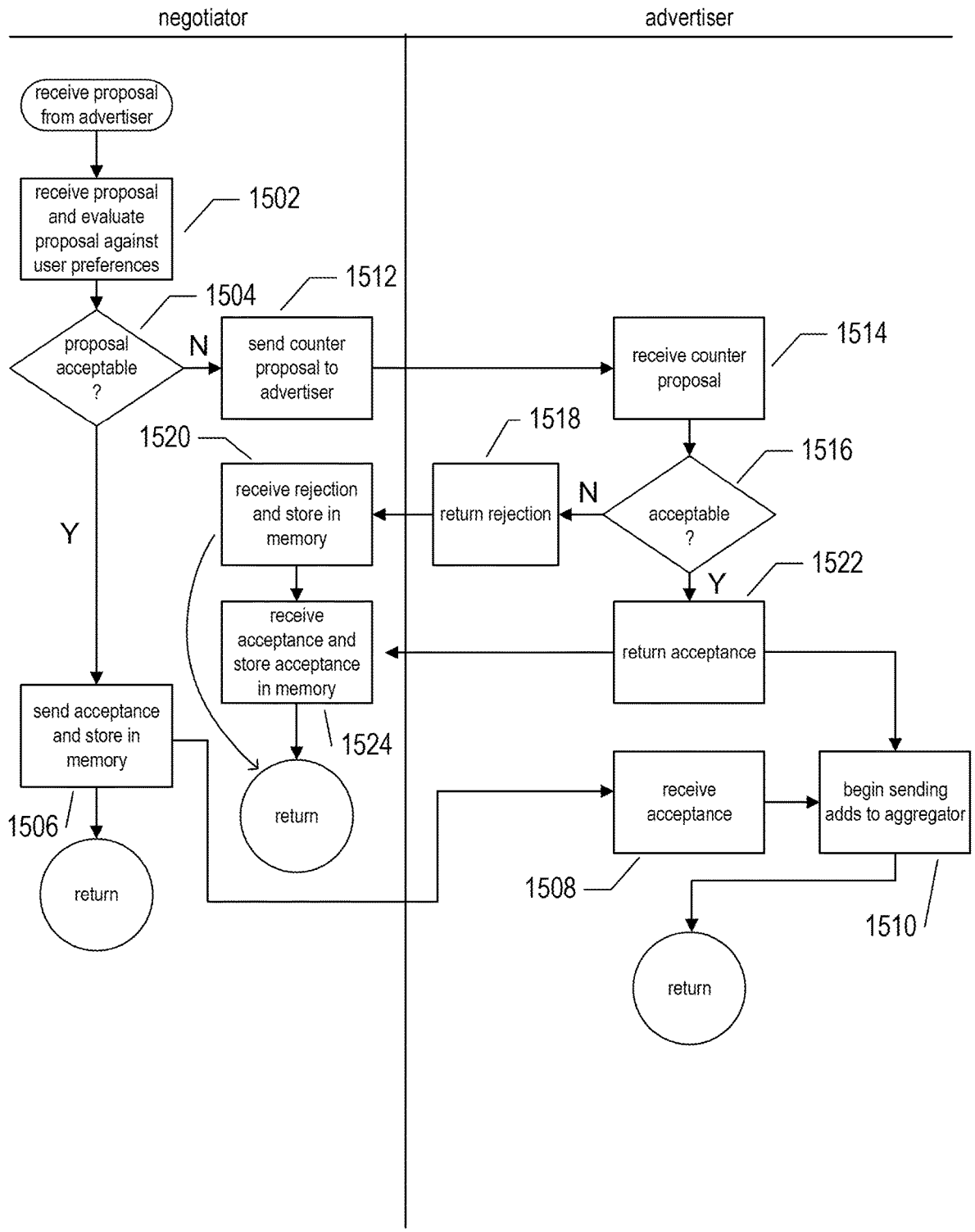
FIG. 15 illustrates a transaction carried out between a negotiator component of the information market and an advertiser.

FIG. 15 illustrates a transaction carried out between a negotiator component of the information market and an advertiser. When an advertiser receives notice that a user/browser is participating in the information market, the advertiser may send proposals to the negotiator for providing advertisements for viewing by the user. The negotiator component (616 in FIG. 6) of the information market negotiates with the advertiser on the user's behalf and, when the negotiations are successful, authorizes the advertiser to begin furnishing advertisements to the aggregator component or components (614 in FIG. 6) for buffering for subsequent inclusion in content provided to the user. In step 1502, the negotiator receives a proposal from an advertiser and evaluates a proposal with respect to user preferences and other user information stored in the user's transaction certificate. When a proposal is acceptable, as determined in step 1504, then, in step 1506, the negotiator sends an acceptance message to the advertiser and stores an indication of the acceptance in memory. In step 1508, the advertiser receives the acceptance message and, as a result, begins transmitting advertisements to the aggregator component in step 1510. When an initial proposal is not acceptable, as determined in step 1504, the negotiator may send a counterproposal to the advertiser in step 1512. The advertiser receives the counterproposal in step 1514 and evaluates the counterproposal to decide whether or not the counterproposal is acceptable. When the counterproposal is not acceptable, as determined in step 1516, the advertiser returns a rejection message, in step 1518, to the negotiator which receives the message in step 1520 and stores an indication of the rejection in memory. Otherwise, the advertiser returns an acceptance message, in step 1522, and then begins sending advertisements to the aggregator in step 1510. The acceptance message is received by the negotiator in step 1524 and an indication of the acceptance is stored in memory. By storing indications of acceptance and rejection of proposals, the negotiator may gain information about advertiser characteristics that allow the negotiator to more effectively negotiate on a user's behalf for advertisements from the advertiser. In general, the negotiation primarily concerns the compensation desired by a user for viewing advertisements furnished by the advertiser, but the negotiations may be more complex, in that different compensation levels may be desired for different types of advertisements, for different times of the day, and based on other such parameters and characteristics.

Figure 16A:
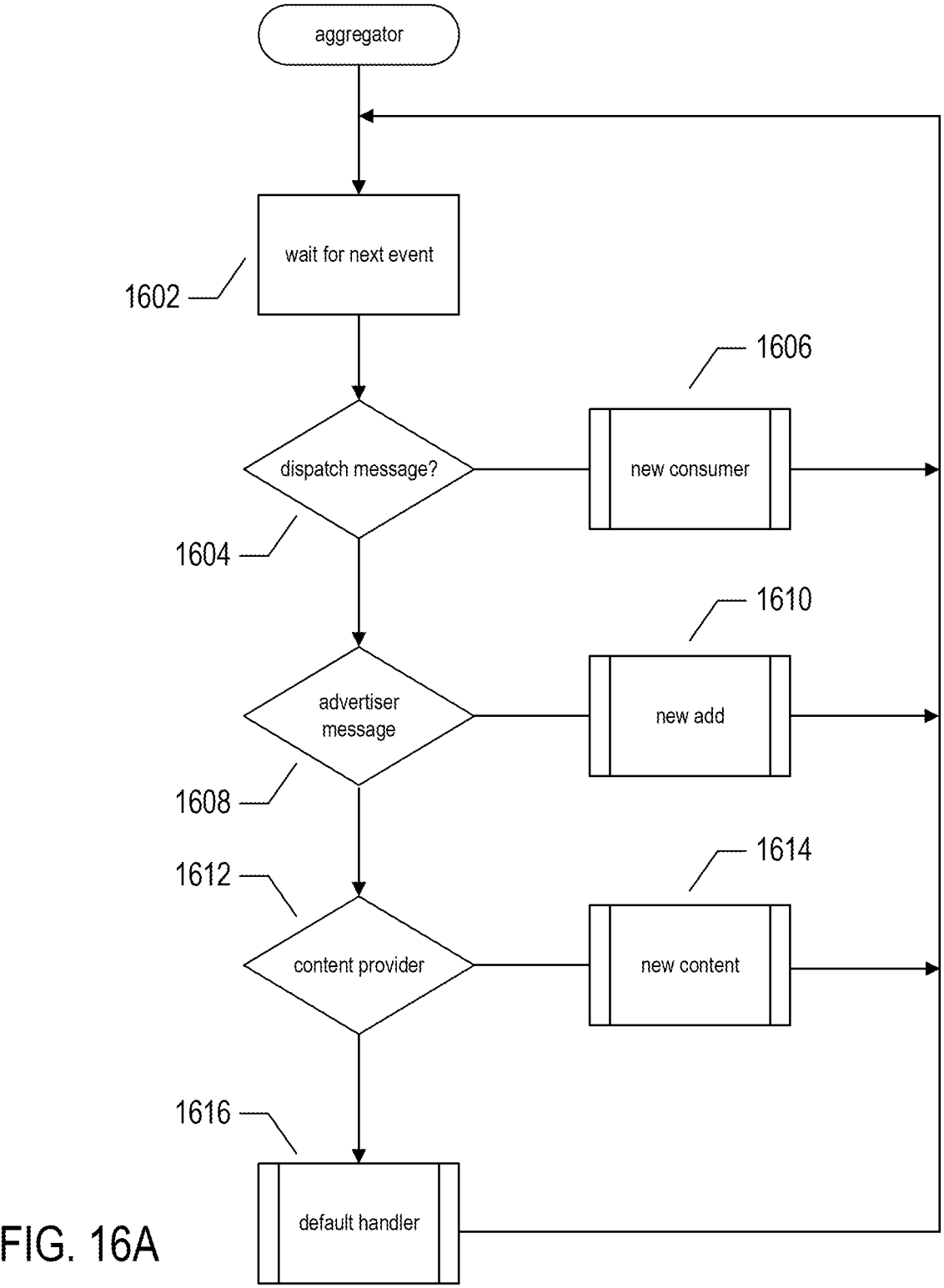
FIGS. 16A-D illustrate operation of the aggregator component or components of an information market.

FIGS. 16A-D illustrate operation of the aggregator component or components of an information market. In general, the aggregator can be described as an event handler, at a high level. FIG. 16A illustrates the event handler. In step 1602, the aggregator waits for a next event. When a next event occurs, the aggregator determines the type of event and calls a corresponding routine for that event. When the event is reception of a dispatch message, as determined in step 1604, then the aggregator calls a "new consumer" routine in step 1606. When the event is reception of an advertiser message, as determined in step 1608, then the routine "new ad" is called in step 1610. When the event is reception of a message from a content provider, as determined in step 1612, then the routine "new content" is called in step 1614. Many other types of events may occur and may be handled by the aggregator, represented by a default handler 1616 in FIG. 16A. The event loop continuously executes within one or more aggregator components of the information market.

Figure 16B:
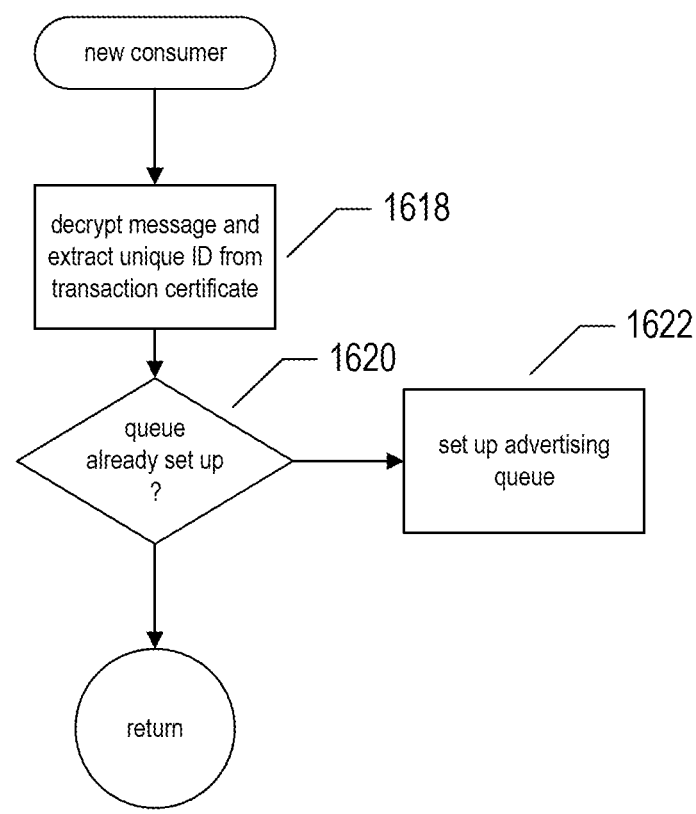

FIG. 16B shows the routine "new consumer" called in step 1606 of FIG. 16A. In step 1618, the aggregator decrypts the message received from a dispatch component and extracts the unique identifier for the user as well as additional information from the transaction certificate sent by the dispatch component on behalf of the user. When a queue and other data structures have not already been set up for the user, as determined in step 1620, then in step 1622, the aggregator sets up an advertising queue and other data structures for the user.

Figure 16C:
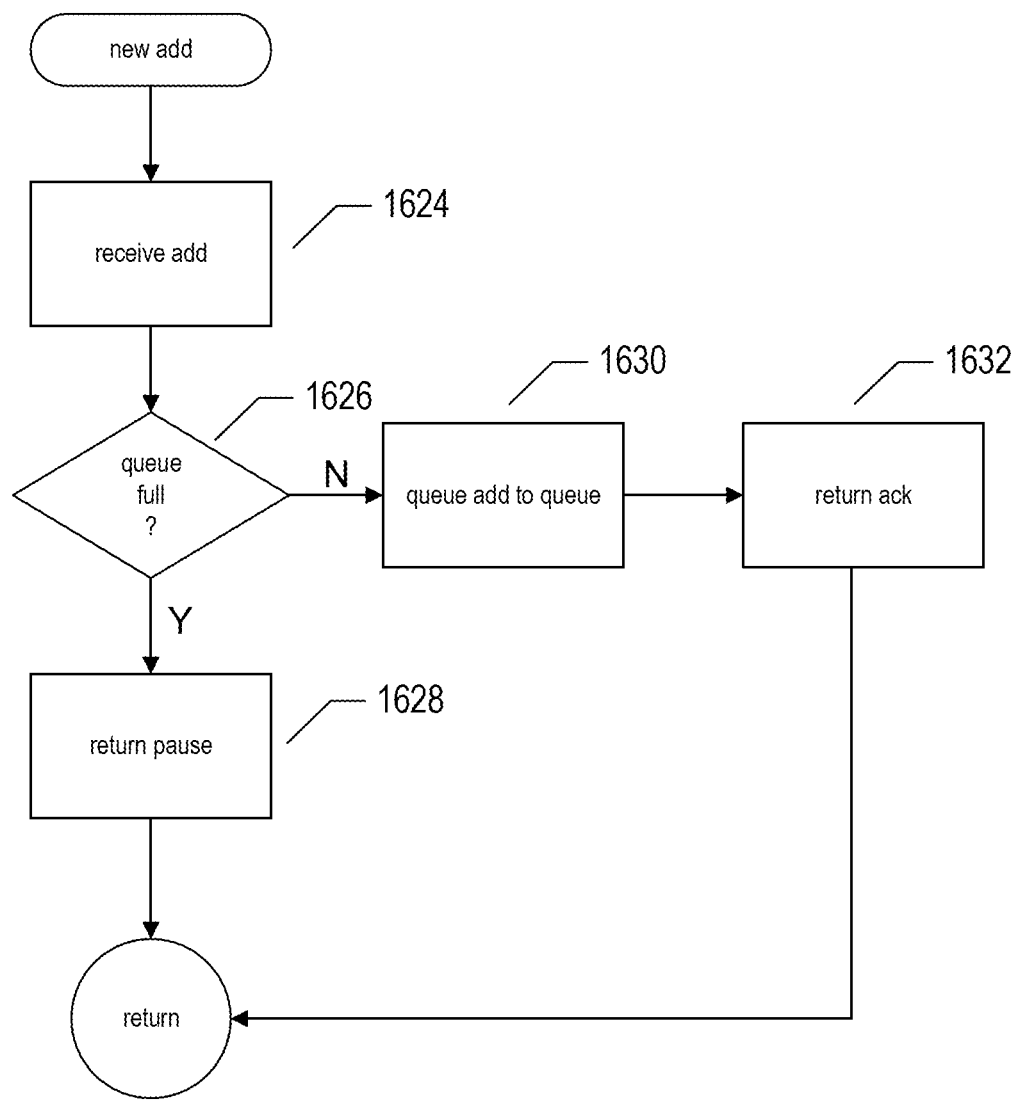

FIG. 16C shows the routine "new ad" called in step 1610 of FIG. 16A. In step 1624, the aggregator receives a new advertisement from an advertiser. When the advertisement queue for the user for which the advertisement has been sent is already full, as determined in step 1626, the aggregator returns a pause message to the advertiser in step 1628. Otherwise, the advertisement referenced in the message is queued to the advertising queue on behalf of the user, the unique identifier for which is included in the message from the advertiser, in step 1630, and the aggregator returns an acknowledgement to the advertiser in step 1632.

Figure 16D:
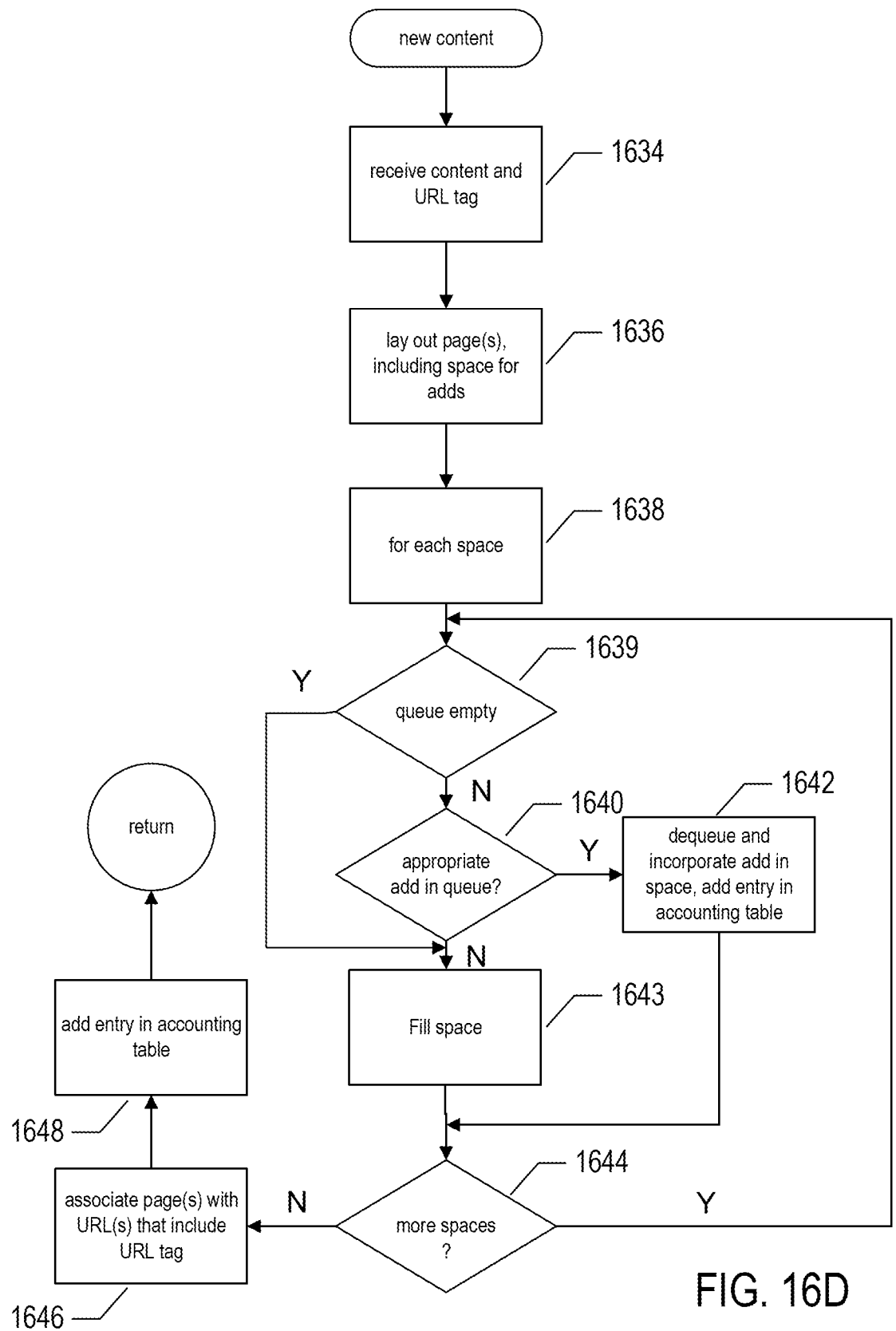

FIG. 16D illustrates the routine "new content" called in step 1614 of FIG. 16A. In step 1634, the aggregator receives a content message and URL tag from a content provider. The URL tag is generally determined by the negotiator component or another information-market component upon successful negotiation of content provision. In step 1636, the aggregator lays out one or more web pages or other information-conveying vehicles, including space for advertisements. Then, in the for-loop of steps 1638-1644, the aggregator attempts to fill each space in the laid-out content vehicle, in step 1636, with advertisements obtained from the advertisement queue for a particular user. When the queue is empty, the advertising space may be otherwise filled, in step 1643. Otherwise, a de-queued advertisement is incorporated into the currently considered space in step 1642. In step 1646, the aggregator associates the completed web page or pages with a URL that incorporates the URL tag received in step 1634. In step 1648, the aggregator updates the accounting tables obtained by the aggregator to reflect compensation owed to the user by advertisers and compensation owed by the user to the content provider.

The above-discussed control-flow diagrams illustrate basic functionality of the information market. In actual implementations, many of the steps may involve greater complexity in implementation logic. For example, it may be the case that a given a web page or other content-provision vehicle accessed by a user may include content provided by two or more content providers, in which case a more complex negotiation may be undertaken by the information market and more complex logic may be carried out by the aggregator to incorporate advertisements and multiple content references into a complete content-provision vehicle. The accounting and billing activities undertaken by the information market may be carried out in any of many different ways, and may involve third-party financial institutions and monitoring of click-through events by information-market components. Additional complexities may arise in the case that a user simultaneously or concurrently accesses the information market through multiple user devices and in the case the information market is distributed across multiple dispatch, negotiator, and aggregator components.

It should be noted that, in certain cases, users may elect to exclusively view advertisements, during a period of time, for compensation, or, in other cases, may view content without advertisements by paying compensation to content providers. The information market is flexible and accommodates many different types of use by content providers, advertisers, and users.

It is important to note that the currently disclosed information market provides for exchange of information and the value among all of the various participants of the information market, including content providers, advertisers, and information consumers. In particular, information consumers can receive compensation for viewing advertisements through the information market, and this compensation may include financial compensation. This is different from current advertising practices, where the only compensation received by an information consumer for viewing advertisements is the ability to view the content in which the advertisements are included. The currently disclosed information market, by contrast, allows an information consumer, such as the user of a personal computer, to receive financial compensation for viewing advertisements in addition to the ability to view the content in which the advertisements are incorporated. The currently disclosed information market also provides for individual transactions between information consumers, advertisers, and content providers, allowing information providers to specifically tailor and price of contents and advertisements to individual users. This also differs from current information-distribution practice.

Although the present invention has been described in terms of particular embodiments, it is not intended that the invention be limited to these embodiments. Modifications within the spirit of the invention will be apparent to those skilled in the art. For example, a large number of different implementations of the information market can be produced by varying one or more of many different design and implementation parameters, including choice of browser technology, programming language, operating system, modular organization, data structures, control structures, and other such parameters. As mentioned above, the information-market components, including the dispatch, aggregator, and negotiator components, may be implemented in discrete, separate computing facilities, in certain implementations, or may be included in one or more of user, advertiser, and content-provider computing facilities. While the above discussion focused primarily on web-browser applications which access and render content and advertisements for display to users, other types of content-accessing and content-rendering components may be designed or enhanced to interface to the information market. Value transactions carried out by the information market may involve monetary transactions or transactions in which goods and services are directly bartered for advertising consumption and content consumption. Finally, the above-described techniques may be applied to many additional types of markets in which goods and services are exchanged, including traditional retail markets. Transaction certificates may be supplied, in such situations, from mobile phones and other computing devices or from smart cards or other types of information-transfer media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An electronic information market system comprising multiple computer systems, each of which has one or more processors, one or more memories, one or more network-communications subsystems, and computer instructions stored in one or more of the one or more memories that control the computer system to cooperate with other of the multiple computer systems to implement the electronic information market system, wherein the multiple computer systems participate in an electronic data network with one or more information-consumer computer systems and one or more advertiser computer systems, each of the information-consumer computer systems is associated with a respective one or more information consumers, and the multiple computer systems include:
    one or more computer systems that each runs one or more dispatcher components, each dispatcher component being configured
        (a) to receive encoded user preferences and transaction certificates from one or more of the information-consumer computer systems, (b) to transmit the transaction certificates and the user preferences to one or more of the advertiser computer systems, (c) to transmit the transaction certificates and the user preferences to one or more negotiator components, each negotiator component running within one of the multiple computer systems of the information market system, (d) to receive access requests from the information-consumer computer systems, and (e) to transmit access requests to one or more of the negotiator components;

one or more computer systems that each runs the one or more negotiator components, each negotiator component being configured (f) to receive the transaction certificates and the encoded user preferences, (g) to negotiate content-access on behalf of the information consumers with the one or more content-provider computer systems, and (h) to negotiate provision of advertisements to the information-consumers with the one or more advertiser computer systems on behalf of the information consumers; and one or more computer systems that each runs one or more dispatcher components, each dispatcher component being configured (i) to receive the encoded user preferences and the transaction certificates from the one or more information-consumer computer systems, (j) to transmit the transaction certificates and the user preferences to the one or more advertiser computer systems, (k) to transmit transaction certificates and user preferences to the one or more negotiator components, (l) to receive access requests from the one or more information-consumer computer systems, and (m) to transmit access requests to the one or more negotiator components.

2. The electronic information market system of claim 1 wherein the multiple computer systems further include one or more computer systems that each runs one or more aggregator components, each aggregator component being configured to combine advertisements received from the advertiser computer systems and content received from the content-provider computer systems and transmitting the combined advertisements and content to the information-consumer computer systems.

3. The electronic information market system of claim 2 wherein each aggregator component comprises:

a queue of advertisements transferred to the aggregator component by one or more of the advertiser computer systems;

one or more web pages that each incorporates advertising within content for transfer to one or more browsers running on one or more of the information-consumer computer systems;

one or more accounting data structures in which the aggregator component accumulates indications of content, advertisements, and associated compensations provided to the aggregator by the advertiser computer systems and the content-provider computer systems on behalf of the information consumers for use in determining the value owed to the information consumers, the advertisers, and the content providers.

4. The electronic information market system of claim 3 wherein the electronic information market system additionally includes an accounting and billing service that mediates accounting and billing based on the accounting information accumulated in one or more accounting data structures by the one or more aggregator components.

5. The electronic information market system of claim 1 wherein each transaction certificate comprises:

the name and address of one of the information consumers;

a unique identifier for the information consumer;

contact information for the information consumer, including one or more of an email address and telephone number;

financial information for the information consumer, including employment information and asset information;

an identifier or reference for an issuing transaction-certificate authority; and a digital signature that is cryptographically secure and that serves as proof that the transaction certificate was issued by the transaction-certificate authority identified by the transaction-certificate-authority identifier to the information consumer identified by the unique identifier for the information consumer.

6. The electronic information market system of claim 5, wherein the transaction certificate is encrypted, by the transaction-certificate authority, using a public browser encryption key, prior to transmission to a browser running on one of the information-consumer computer systems.

7. The electronic information market system of claim 6 wherein the transaction-certificate authority receives the public browser encryption key by one of:

extracting the public browser encryption key from a message, sent by the browser running on the information-consumer computer system, that requests the transaction certificate; and obtaining the public browser encryption key from a database of browser public encryption keys maintained by the information market.

8. The electronic information market system of claim 1 wherein the encoded user preferences are generated from a user-preferences data structure, the user-preference data structure including one or more of:

a unique identifier for an information consumer;

a list of preferred advertising subject matter;

a list of preferred times of day during which the preferred advertising subject matter is most desirable;

a preferred ratio of content to advertising;

a desired compensation per minute or web-page area that the information consumer wishes to receive for viewing advertisements;

a list of preferred advertisers;

subject-matter and advertiser filters; and information that characterize an information consumer's content and content-delivery preferences.

9. The electronic information market system of claim 8 wherein the encoded user preferences are encrypted using a public dispatcher encryption key, along with a transaction certificate, prior to transmitting the encrypted encoded user preferences and transaction certificate to a dispatcher computer system by an information-consumer computer system.

10. The electronic information market system of claim 8 wherein the encoded user preferences are encrypted using a public advertiser encryption key, along with a transaction certificate, prior to transmitting the encrypted encoded user preferences and transaction certificate to an advertiser computer system by a dispatcher component running on one of the multiple information-market computer systems.

11. The electronic information market system of claim 8 wherein the encoded user preferences are encrypted using a public negotiator encryption key, along with a transaction certificate, prior to transmitting the encrypted encoded user preferences and transaction certificate to a negotiator component running on one of the multiple information-market computer systems by a dispatcher component.

12. The electronic information market system of claim 8 wherein the encoded user preferences are encrypted using a public aggregator encryption key, along with a transaction certificate, prior to transmitting the encrypted encoded user preferences and transaction certificate to an aggregator component running on one of the multiple information-market computer systems computer system by a dispatcher component.

13. The electronic information market system of claim 1 further including a resource data structure that is exchanged between information-market computer systems, the resource data structure including one or more of:
- a unique identifier that identifies a particular information consumer;
- an identifier that identifies a particular content provider or advertiser;
- a URI for a particular information-content file or advertising file;
- an indication of the subject matter of the content or advertising;
- an indication of the size of the content or advertising, in bytes or in other data-storage units;
- information that characterizes content or advertising;
- a digital signature that authenticates the resource data structure as having been prepared by the content provider or advertiser identified by the identifier that identifies a particular content provider or advertiser.

14. The electronic information market system of claim 1 wherein information exchanges between content providers, advertisers, and information consumers are negotiated on an individual basis within the electronic information market system.

15. The electronic information market system of claim 14 wherein information consumers may transmit information to advertisers allowing advertisers to accurately target advertising to selected market segments, allowing advertisers are able to precisely target ads to individuals willing to view them.

16. The electronic information market system of claim 15 wherein advertisers vary the compensation they pay to information consumers based on one or more of:
- the ability of an information consumer to influence others to view advertisements or purchase advertised goods and services;
- social-networking metrics indicating that an advertisement may be secondarily distributed by an information consumer;
- the current phase of a marketing campaign;
- the length of time that an information consumer has participated in the information market; and
- an information consumer's characteristics obtained from a transaction certificate, encoded user preferences, and from information sources accessible through the transaction certificate.

* * * * *